US012171265B2

(12) United States Patent
Chen

(10) Patent No.: US 12,171,265 B2
(45) Date of Patent: Dec. 24, 2024

(54) EFFICIENT REINFORCED HEATING ASSEMBLY AND ATOMIZING DEVICE THEREWITH

(71) Applicant: Shenzhen Huachengda Precision Industry Co. Ltd., Guangdong (CN)

(72) Inventor: Ping Chen, Guangdong (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 434 days.

(21) Appl. No.: 17/765,007

(22) PCT Filed: Sep. 18, 2020

(86) PCT No.: PCT/CN2020/116262
§ 371 (c)(1),
(2) Date: Mar. 30, 2022

(87) PCT Pub. No.: WO2022/056855
PCT Pub. Date: Mar. 24, 2022

(65) Prior Publication Data
US 2022/0408815 A1 Dec. 29, 2022

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/485* (2020.01); *H05B 3/06* (2013.01); *H05B 2203/021* (2013.01)

(58) Field of Classification Search
CPC ........ A24F 40/46; H05B 3/06; H05B 2203/21
See application file for complete search history.

(56) References Cited

U.S. PATENT DOCUMENTS

2016/0106153 A1* 4/2016 Zhu ....................... A24F 47/008
2019/0191772 A1 6/2019 Qiu

FOREIGN PATENT DOCUMENTS

CN 104287098 A 1/2015
CN 208446606 U 2/2019
(Continued)

OTHER PUBLICATIONS

International Search Report of PCT Patent Application No. PCT/CN2020/116262 issued on Jun. 23, 2021.
(Continued)

*Primary Examiner* — Christopher M Rodd
*Assistant Examiner* — Ronnie Kirby Jordan

(57) ABSTRACT

An efficient reinforced heating assembly, including a reinforcing frame, a liquid conducting member and at least two heating members. The reinforcing frame is provided with a vent opening for air to pass therethrough. The at least two heating members are disposed on the reinforcing frame, disposed in the vent opening or covered on the vent opening, to be in contact with the air. The liquid conducting member is disposed on a side of the heating member and in contact with the heating member, so that the liquid conducting member is able to conduct an external liquid to the heating member for heating and atomizing to generate an aerosol, which is output via the vent opening. An atomizing device is further provided, including a shell and the efficient reinforced heating assembly disposed in the shell. The reinforcing frame supports the heating member to improve the strength of the heating member.

18 Claims, 24 Drawing Sheets

(51) Int. Cl.

| | |
|---|---|
| ***A24F 40/44*** | (2020.01) |
| ***A24F 40/485*** | (2020.01) |
| ***H05B 3/06*** | (2006.01) |

(56) References Cited

FOREIGN PATENT DOCUMENTS

| | | | |
|---|---|---|---|
| CN | 209135478 | U | 7/2019 |
| WO | 2016061859 | A1 | 4/2016 |
| WO | 2018041063 | A1 | 3/2018 |
| WO | 2021258286 | A1 | 12/2021 |

OTHER PUBLICATIONS

Extended European Search Report of Counterpart European Patent Application No. 20953713.3 issued on Oct. 14, 2022.

First Office Action of Counterpart Japanese Patent Application No. 2021-573395 issued on Feb. 21, 2023.

First Office Action of Counterpart Canadian Patent Application No. 3,156,576 issued on Jul. 13, 2023.

* cited by examiner

EFFICIENT REINFORCED HEATING ASSEMBLY AND ATOMIZING DEVICE THEREWITH

TECHNICAL FIELD

The present disclosure relates to the technical field of atomization, in particular to an efficient reinforced heating assembly and an atomizing device therewith.

DESCRIPTION OF RELATED ART

A heating assembly can be applied to an atomizer to heat and atomize a liquid in the atomizer. The strength of the heating member of many heating assemblies is low, which is easy to cause poor deformation in the process of transportation and assembly, which is not conducive to mass production; And the atomization efficiency is low.

SUMMARY OF THE DISCLOSURE

The present disclosure aims to provide, in view of the above-described deficiencies of the prior art, an efficient reinforced heating assembly and an atomizing device therewith.

A technical solution adopted by the present disclosure is to provide an efficient reinforced heating assembly, including:

a reinforcing frame, wherein the reinforcing frame is provided with a vent opening for air to pass therethrough;

at least two heating members, wherein the at least two heating members are disposed on the reinforcing frame, disposed in the vent opening or covered on the vent opening, to be in contact with the air; and at least one liquid conducting member, wherein the at least one liquid conducting member is disposed on at least one side of the at least two heating members and in contact with the at least two heating members, so that the at least one liquid conducting member is able to conduct an external liquid to the at least two heating members for heating and atomizing to generate an aerosol, which is output via the vent opening.

In an embodiment, each heating member includes a heating portion, and the heating portion is provided with a hollow-out structure to form a circuit track for heating, so that the heating portion generates heat when the heating member is powered on.

In an embodiment, the circuit track includes a transverse track, and/or a longitudinal track, and/or an inclined track, and/or a curved track, and/or a meshed track, and/or a grid track.

In an embodiment, each heating member includes a contact portion disposed on an outer periphery of the heating portion and connected with the heating portion, and the contact portion is embedded in or attached to the reinforcing frame, so as to fix the heating member on the reinforcing frame.

In an embodiment, the contact portion includes a longitudinal portion extending outward from an edge of the heating portion and a transverse portion disposed on the longitudinal portion, and the longitudinal portion is not parallel to the transverse portion; or alternatively, the contact portion is in a straight strip shape, and extends outward from an edge of the heating portion; or alternatively, the contact portion extends outward from an edge of the heating portion, and is provided with a fixing hole, and the contact portion is in an annular frame shape.

In an embodiment, the contact portion is bent toward a thickness direction of the heating member.

In an embodiment, each heating member includes an electrode portion connected with the heating portion and disposed on an out periphery of the heating portion; and the electrode portion is embedded in or attached to the reinforcing frame.

In an embodiment, the at least two heating members are respectively disposed on different sides of the reinforcing frame.

In an embodiment, the heating members is disposed on an outer side of the reinforcing frame; the reinforcing frame is provided with an airflow passage extending from a top surface to a bottom surface thereof, and the vent opening communicates the heating member with an inner side of the airflow passage, so that the aerosol generated by the heating member enters the airflow passage via the vent opening.

In an embodiment, the liquid conducting member is disposed on an outer side of the heating members, the efficient reinforced heating assembly includes a cover, and the cover covers and fixes the liquid conducting member and the heating member; the cover is provided with a liquid inlet communicating the liquid conducting member with an outside, so that the external liquid is in contact with the liquid conducting member via the liquid inlet, and further conducted to the conductive member through the liquid conducting member for heating and atomizing.

In an embodiment, the efficient reinforced heating assembly includes at least two heating members, at least two liquid conducting members and at least two covers respectively disposed on two sides of the reinforcing frame; an outer side of the heating members on each side of the reinforcing frame is provided with one liquid conducting members, and the cover on each side of the reinforcing frame covers the liquid conducting member and the heating member.

In an embodiment, the heating members, the liquid conducting members and the covers are respectively disposed on two opposite sides of the reinforcing frame; each cover includes a main body and extending portions disposed on edges of two sides of the main body, and an inner side of the main body is provided with a receiving cavity open towards the reinforcing frame, each liquid conducting member is received in the corresponding receiving cavity; the extending portions of the covers on two sides of the reinforcing frame pass by a side of the reinforcing frame in a direction opposite to each other, and front ends of the extending portions of the covers on two sides of the reinforcing frame are butted against each other.

In an embodiment, the airflow passage includes an air outlet defined in a top surface of the reinforcing frame and an air inlet defined in a bottom surface of the reinforcing frame; and a side of the heating member in contact with the air is inclined towards an air inlet direction of the airflow passage, so that the air flow is blown to the side of the heating member in contact with the air.

In an embodiment, the liquid conducting member is received in the reinforcing frame, an inner side of the heating member is in contact with the liquid conducting member, and the vent opening communicates the heating member with an outer side of the reinforcing frame.

In an embodiment, the heating members are respectively in contact with different sides of the liquid conducting member, and at least two vent openings are respectively defined in the sides, corresponding to the heating members, of the reinforcing frame.

In an embodiment, a top surface or a side surface of the reinforcing frame is provided with a liquid inlet for communicating the liquid conducting member with an outside, so that the external liquid is in contact with the liquid conducting member via the liquid inlet, and further conducted to the heating member through the liquid conducting member for heating and atomizing.

In an embodiment, the liquid conducting member extends laterally out of the reinforcing frame for the external liquid to be in contact with the liquid conducting member via the liquid inlet, and further conducted to the heating member through the liquid conducting member for heating and atomizing.

In an embodiment, an outer side of the reinforcing frame is provided with a ventilation groove extending from a bottom surface to a top surface thereof, and at least part of the heating member is exposed in the ventilation groove.

In an embodiment, a top surface of the reinforcing frame is provided with a longitudinal air port, a lateral surface of the reinforcing frame is provided with a transverse air port, a communicating passage for communicating the longitudinal air port with the transverse air port is provided in the reinforcing frame, and the transverse air port faces an exposed portion of the heating member, at least part of the heating member is exposed in the communicating passage, so that the air flow successively passes through the transverse air port, the communicating passage and the longitudinal air port to bring out the aerosol generated by the heating member.

In an embodiment, the reinforcing frame includes a first portion and a second portion, the first portion and the second portion frame the liquid conducting member from two sides of the liquid conducting member and are connected with each other; at least one heating member is provided on a lateral side of the liquid conducting member and disposed between the reinforcing frame.

In an embodiment, the heating member is disposed obliquely to an air flow direction, so that the air flow is blown to a side of the heating member in contact with the air.

A technical solution adopted by the present disclosure is to further provide an atomizing device, including a shell and the above efficient reinforced heating assembly disposed in the shell; wherein the shell is provided with an air inlet passage and an air outlet passage which are successively communicated, and the air inlet passage and the air outlet passage are respectively communicated with two ends of the airflow passage, so that an air flow successively passes through the air inlet passage, the airflow passage and the air outlet passage, to output the aerosol generated by the heating assembly via the air outlet passage.

By implementing the present disclosure has at least the following beneficial effects: in the atomizing device and the heating assembly, the reinforcing frame supports the heating member, so as to improve the strength of the heating member; moreover, since at least two heating members are provided, the heating atomization efficiency is higher, and the effect of small volume and large atomization amount is realized.

BRIEF DESCRIPTION OF THE DRAWINGS

For better understanding the technical features in the embodiments of the disclosure, the attached drawings used in the embodiments or the description of the prior art will be briefly described hereinafter. It is obvious that the attached drawings in the following description are only some embodiments of the disclosure. For those skilled in the art, other drawings can also be obtained from these drawings without paying creative labor.

Figure 1:
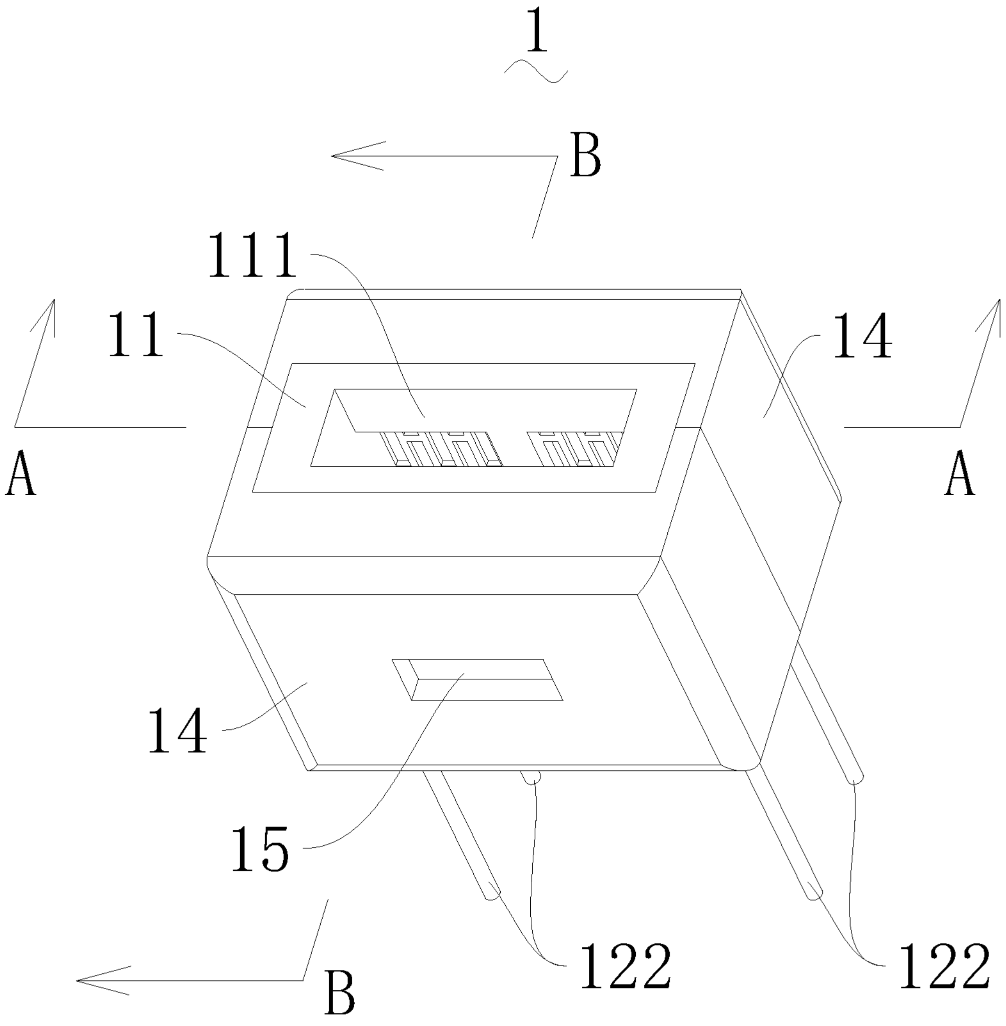
FIG. 1 is a schematic structural view of an efficient reinforced heating assembly in a first embodiment of the present disclosure.
Figure 2:
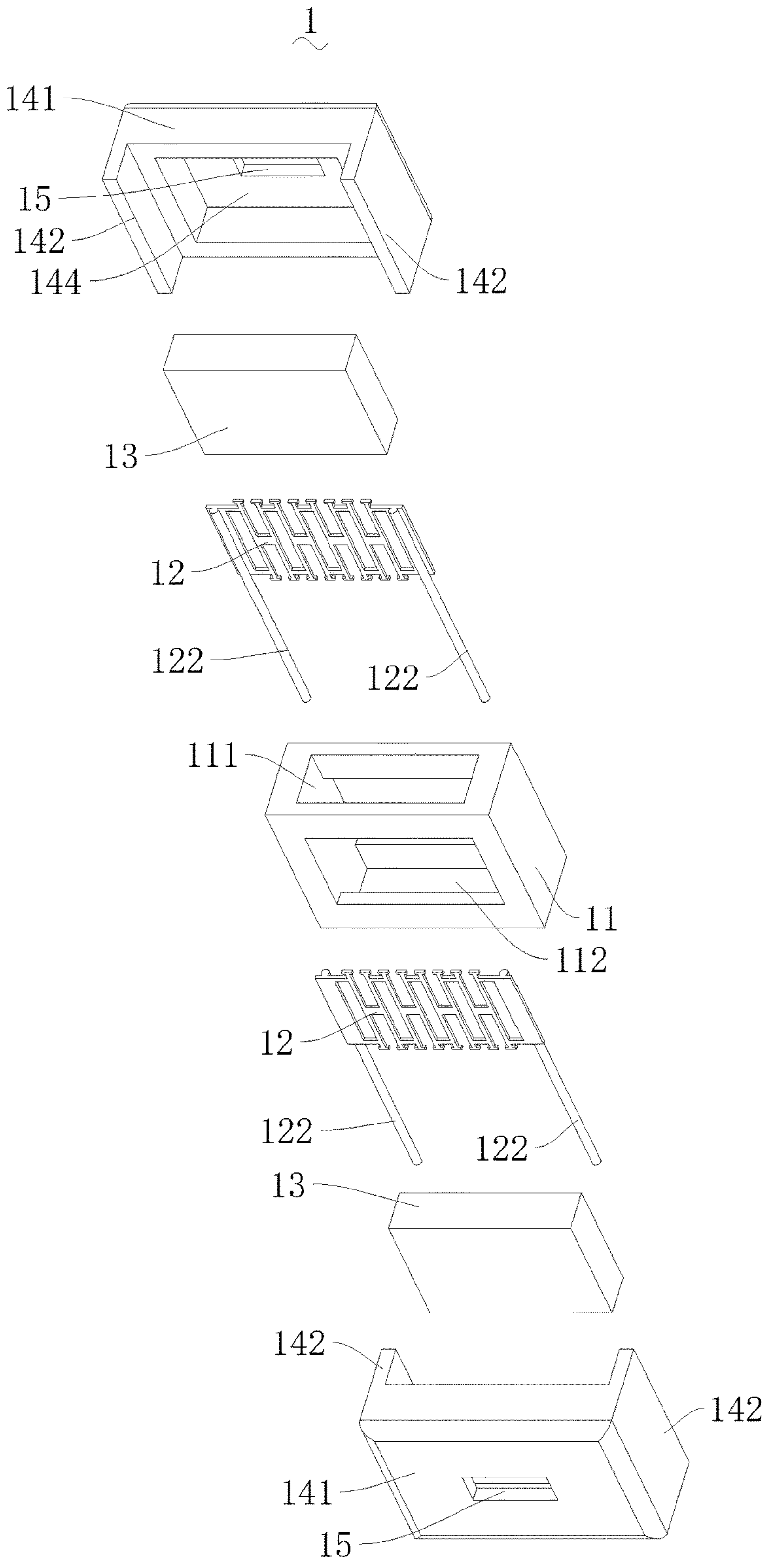
FIG. 2 is an exploded view of the efficient reinforced heating assembly in FIG. 1.
Figure 3:
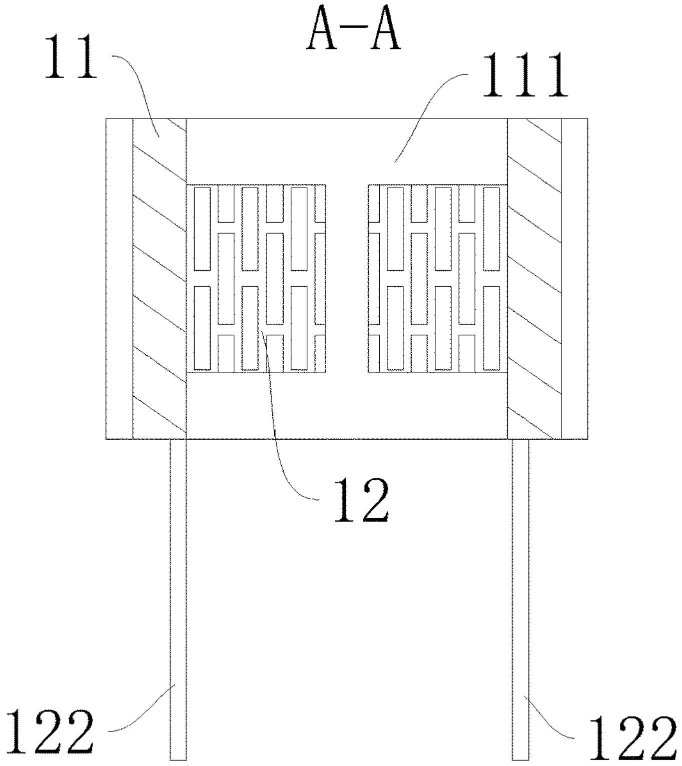
FIG. 3 is an A-A sectional view of FIG. 1.
Figure 4:
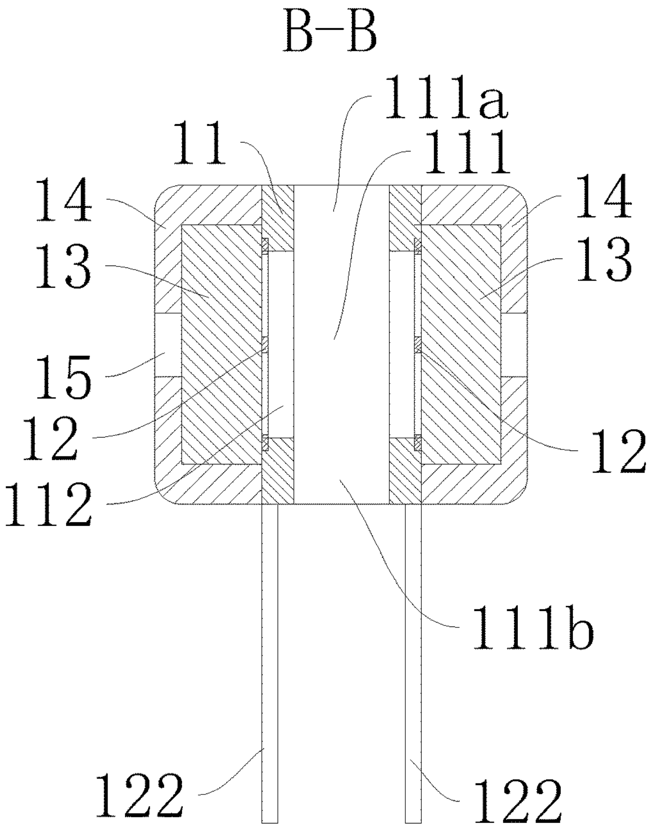
FIG. 4 is a B-B sectional view of FIG. 1.
Figure 5:
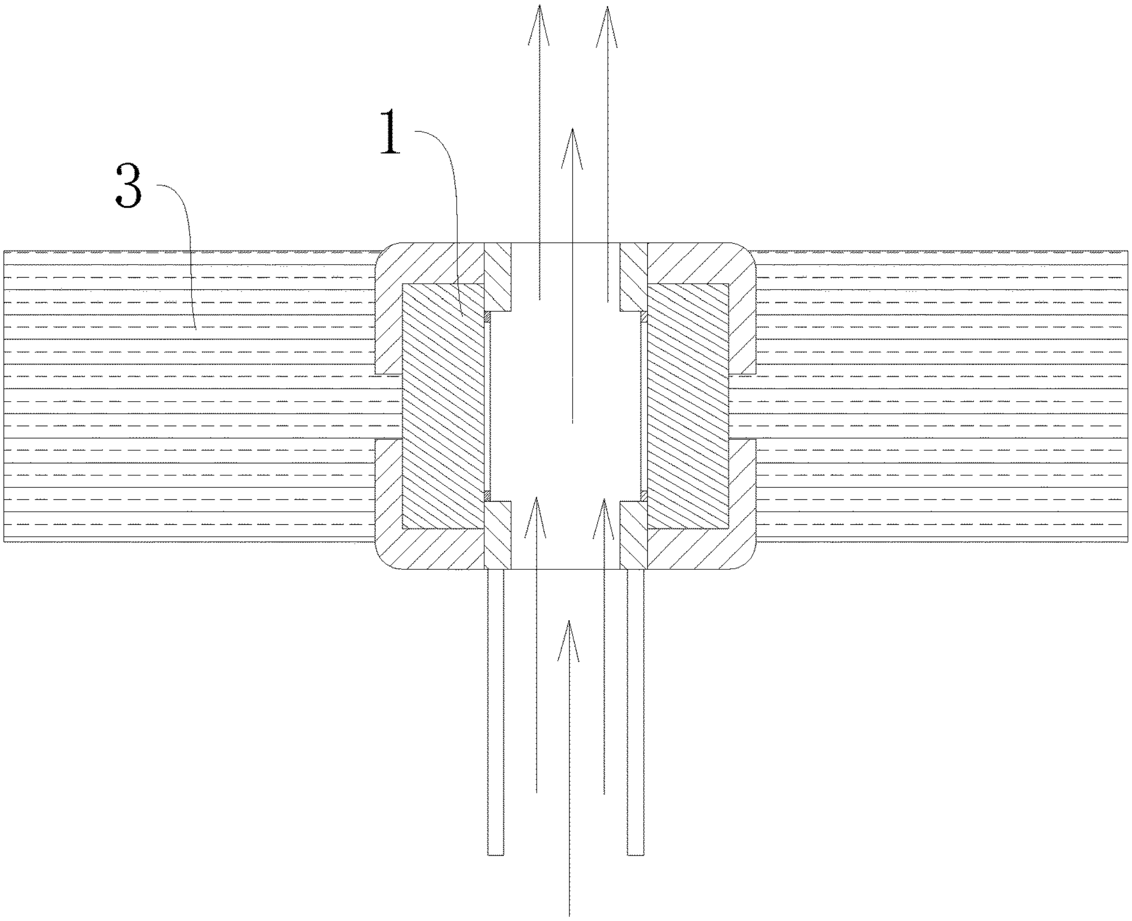
FIG. 5 is a state diagram showing a liquid conducting member in the efficient reinforced heating assembly in FIG. 4 is in contact with a liquid.

Wherein, the reference marks in the drawings represent: heating assembly, 1; reinforcing frame, 11; airflow passage, 111; air outlet, 111*a*; air inlet, 111*b*; vent opening, 112; first portion, 11*a*; second portion, 11*b*; heating member, 12; hollow-out structure, 121, electrode lead, 122; fixing hole, 123; heating portion, 12*a*; contact portion, 12*b*; electrode portion, 12*c*; liquid conducting member, 13, cover, 14; main body, 141; extending portion, 142; receiving cavity, 144; liquid inlet, 15; shell, 2; air inlet passage, 21; air outlet passage, 22; liquid storage chamber, 23; liquid, 3.

DESCRIPTION OF THE EMBODIMENTS

For better understanding of the technical features, objects and effects of the present disclosure, the specific embodiments of the present disclosure will be described in detail with reference to the accompanying drawings. It should be understood that the orientation or the position relationship indicated by relative terms such as “front”, “back”, “upper”, “lower”, “left”, “right”, “longitudinal”, “lateral”, “vertical”, “horizontal”, “top”, “bottom”, “inner”, “outer”, “head”, and “tail” should be construed to refer to the orientation or the position relationship as then described or as illustrated in the drawings under discussion. These relative terms are for convenience of description and do not require that the present disclosure be constructed or operated in a particular orientation. It should be further noted that, in the present disclosure, unless specified or limited otherwise, the terms “mounted”, “connected”, “coupled”, “fixed”, “arranged”, “disposed” and the like are used broadly, and can be, for example, fixed connections, detachable connections, or integral connections; can also be direct connections or indirect connections via intervening structures; can also be inner communications of two elements. When one component is described to be “located on” or “located below” another component, it means that the component can be “directly” or “indirectly” located on another component, or there may be one or more intervening component located therebetween. The terms “first”, “second”, “third” and the like are only used for the convenience of describing the technical solution, and cannot be understood as indicating or implying the relative importance or implicitly indicating the number of the indicated technical features. Therefore, features defined with “first”, “second”, “third”, etc. may explicitly or implicitly indicates that one or more of these features can be included. For those of ordinary skill in the art, the specific meaning of the above-mentioned terms in the present disclosure can be understood according to specific circumstances.

In the description hereinbelow, for purposes of explanation rather than limitation, specific details such as specific systematic architectures and techniques are set forth in order to provide a thorough understanding of the embodiments of the present disclosure. However, it will be apparent to persons skilled in the art that the present disclosure may also be implemented in absence of such specific details in other embodiments. In other instances, detailed descriptions of well-known systems, devices, circuits, and methods are omitted so as not to obscure the description of the present disclosure with unnecessary detail.

Referring to FIGS. 1-33, an efficient reinforced heating assembly 1 in some embodiments of the present disclosure includes:

- a reinforcing frame 11, which is provided with a vent opening 112 for air to pass therethrough;
- at least two heating members 12, which are arranged on the reinforcing frame 11, and are disposed in the vent opening 112 or covered on the vent opening 112 to be in contact with the air; and
- a liquid conducting member 13, which is arranged on one side of the heating member 12 and in contact with the heating member 12, so that the liquid conducting member 13 can conduct an external liquid 3 to the heating member 12 for heating and atomizing to produce an aerosol, which is output via the vent opening 112.

In the heating assembly 1, the reinforcing frame 11 supports the heating member 12, thereby improving the strength of the heating member 12. Moreover, since at least two heating members 12 are provided, the heating atomization efficiency is higher, and the effect of small volume and large atomization amount is realized.

The heating member 12 includes a heating portion 12*a*, which is provided with a hollow-out structure 121 to form a circuit track for heating, so that the heating portion 12*a* can generate heat when the heating member 12 is powered on. The circuit track of the heating portion 12*a* may include a transverse track, and/or a longitudinal track, and/or an inclined track, and/or a curved track, and/or a meshed track, and/or a grid track, such as a broken line circuit track (see FIGS. 6-8 and FIG. 10) or a waved circuit track (see FIG. 9). The broken line circuit track includes transverse tracks and longitudinal tracks. The waved circuit track includes longitudinal tracks and inclined tracks, or includes transverse tracks and inclined tracks. In this way, a plurality of longitudinal support ribs are provided, the support ribs extend outward to form contact portions 12*b*, and the ribs are fixed by the frame to make the heating member 12 have a certain support strength.

The heating member 12 includes contact portions 12*b* arranged on an outer periphery of the heating portion 12*a* and connected with the heating portion 12*a*. The contact portions 12*b* are in contact connection with the reinforcing frame 11, and the contact portions 12*b* are embedded in or attached to the reinforcing frame 11 to fix the heating member 12 on the reinforcing frame 11 and make the heating member 12 have a certain supporting strength.

Figure 6:
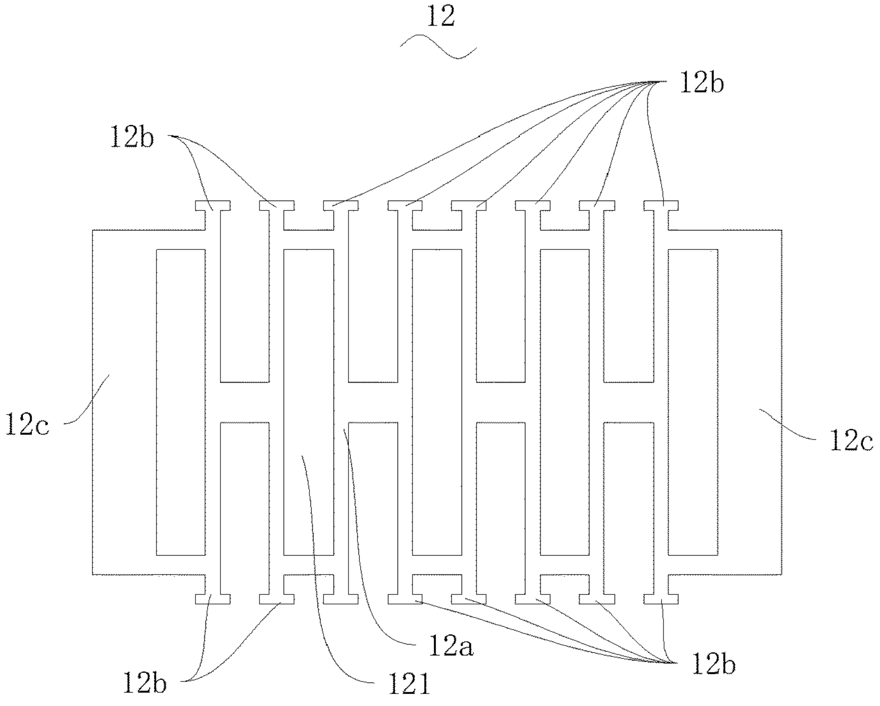
FIG. 6 is a front view of a heating member in a first embodiment of the present disclosure.
Figure 7:
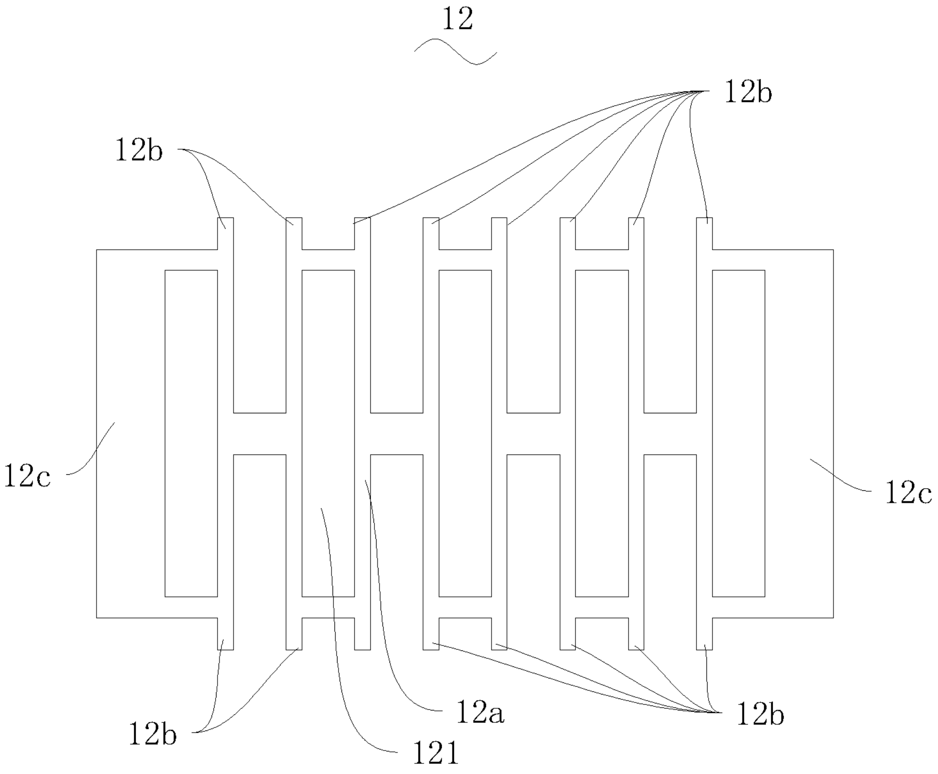
FIG. 7 is a front view of a heating member in a second embodiment of the present disclosure.
Figure 8:
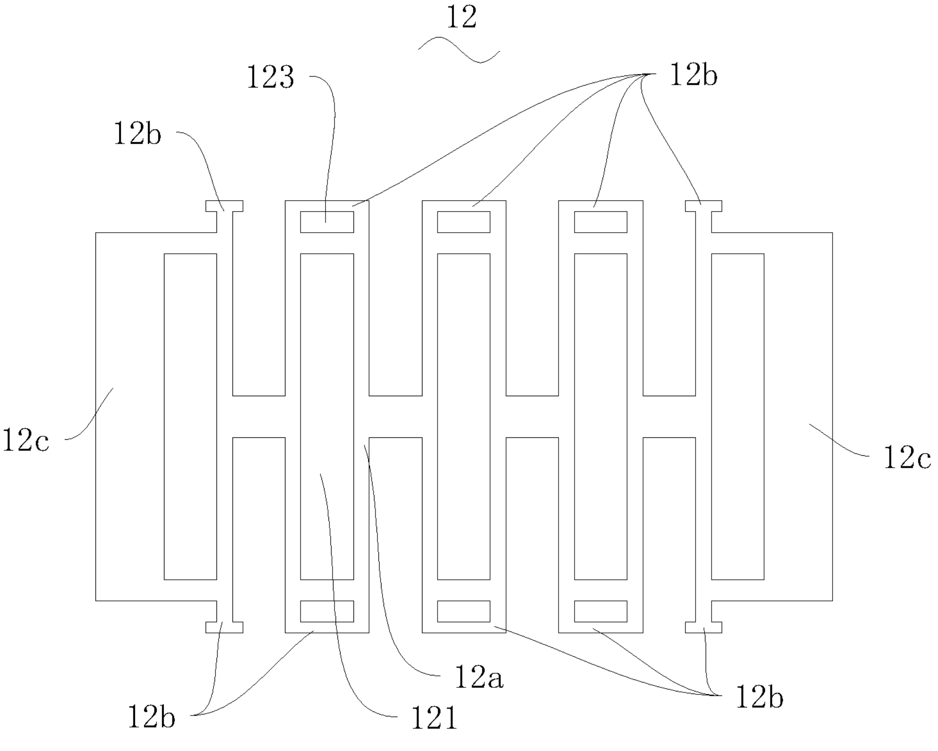
FIG. 8 is a front view of a heating member in a third embodiment of the present disclosure.
Figure 9:
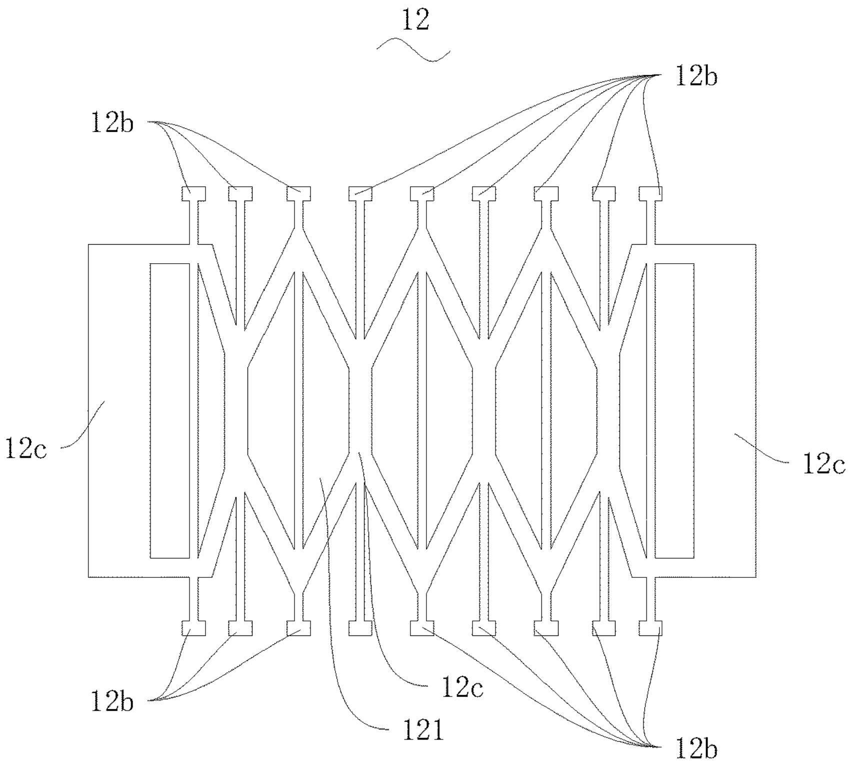
FIG. 9 is a front view of a heating member in a fourth embodiment of the present disclosure.
Figure 10:
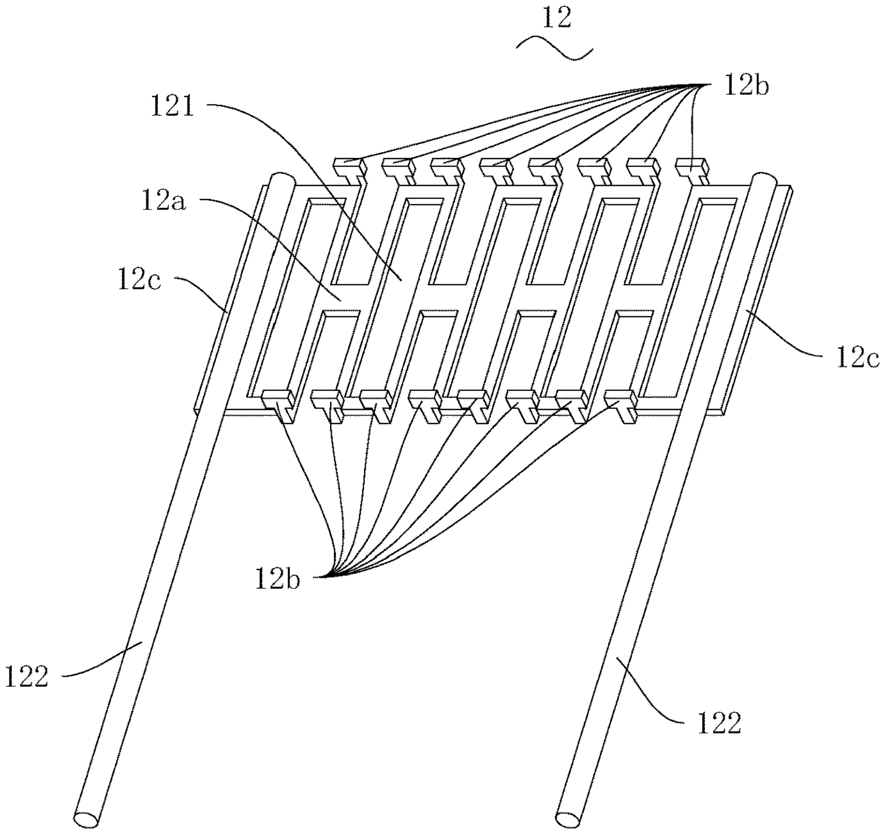
FIG. 10 is a front view of a heating member in a fifth embodiment of the present disclosure.
Figure 11:
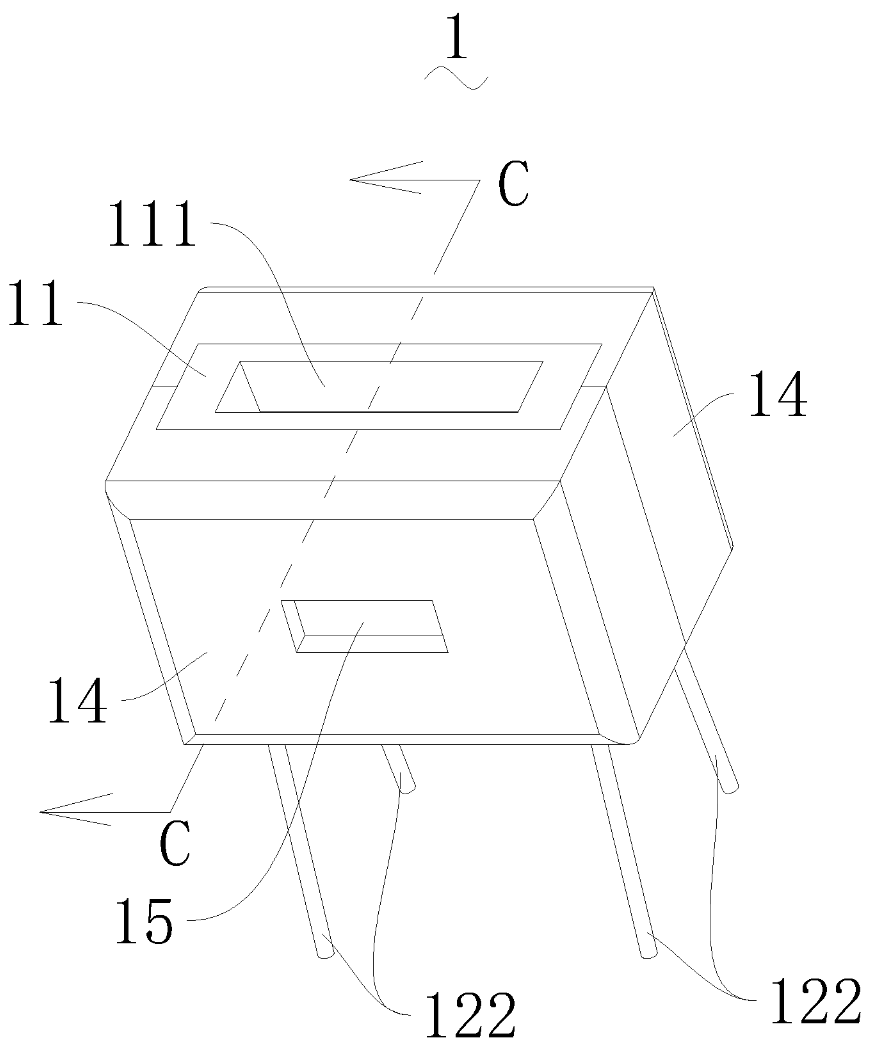
FIG. 11 is a schematic structural view of an efficient reinforced heating assembly in a second embodiment of the present disclosure.
Figure 12:
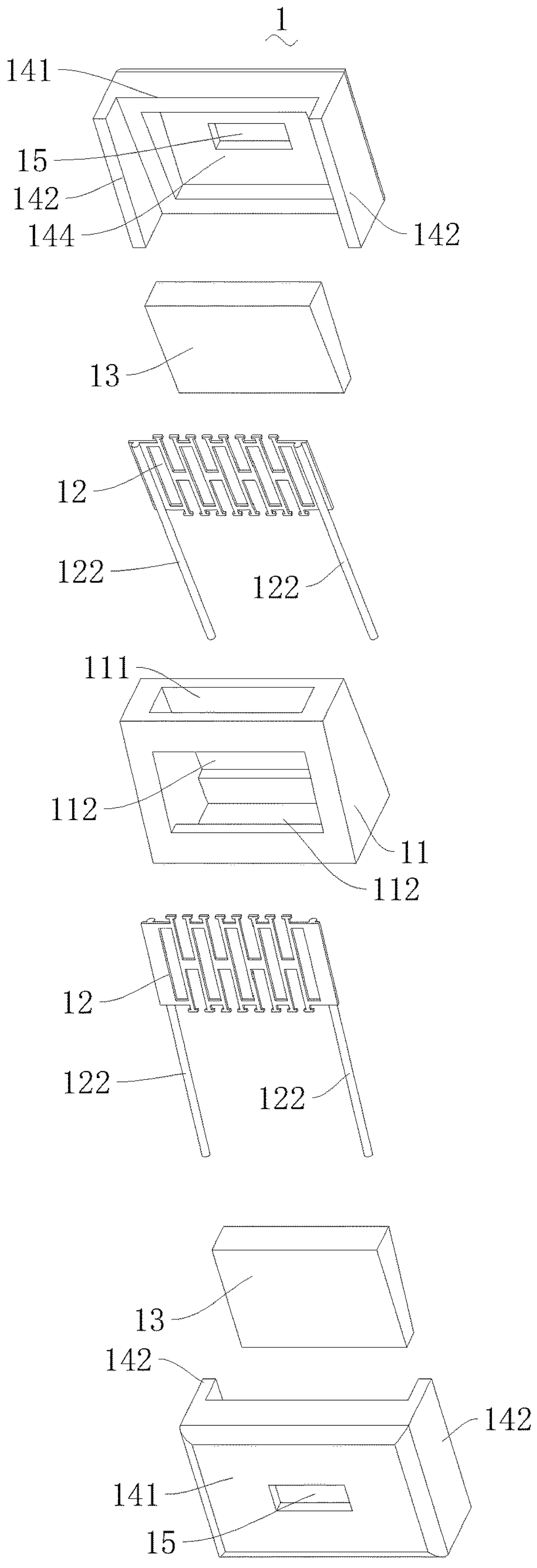
FIG. 12 is an exploded view of the efficient reinforced heating assembly in FIG. 11.
Figure 13:
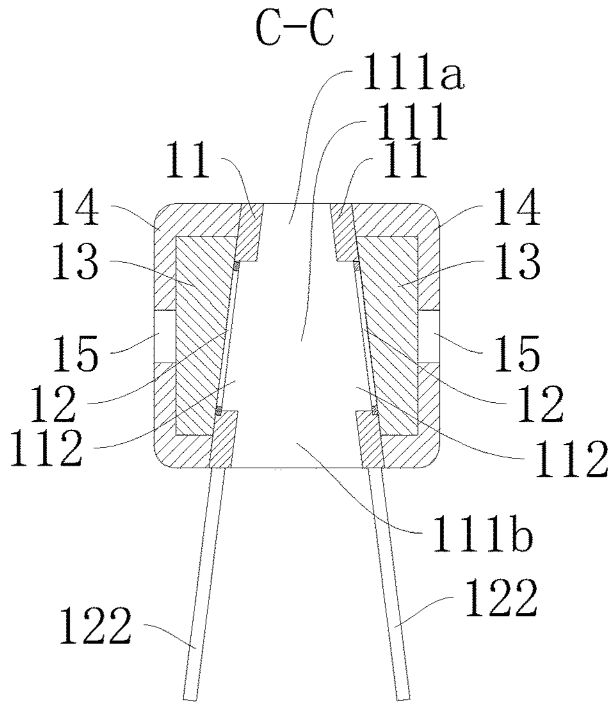
FIG. 13 is a C-C sectional view of FIG. 11.
Figure 14:
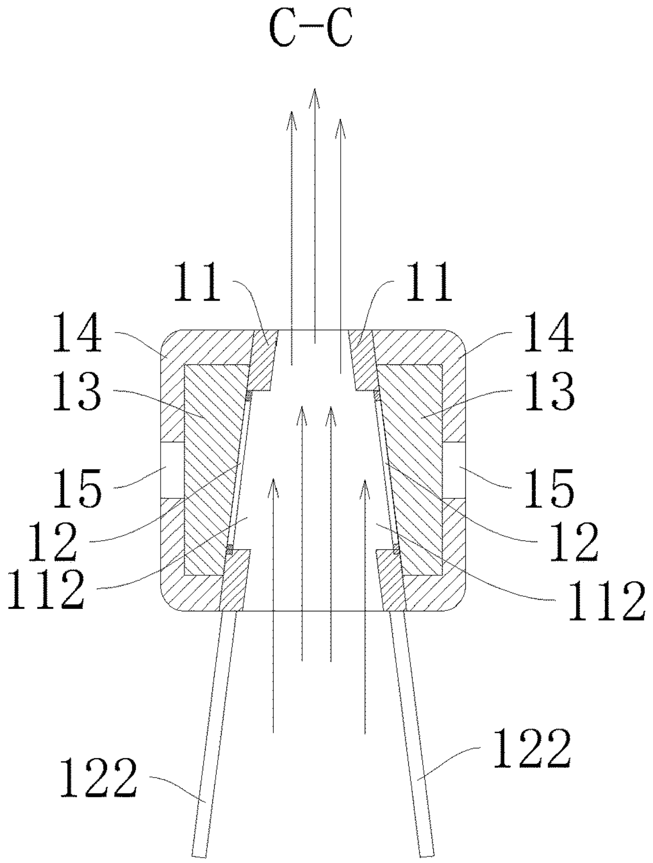
FIG. 14 is a schematic diagram showing an airflow direction of an airflow passage in the efficient reinforced heating assembly in FIG. 13 (wherein the arrows indicate the airflow direction)
Figure 15:
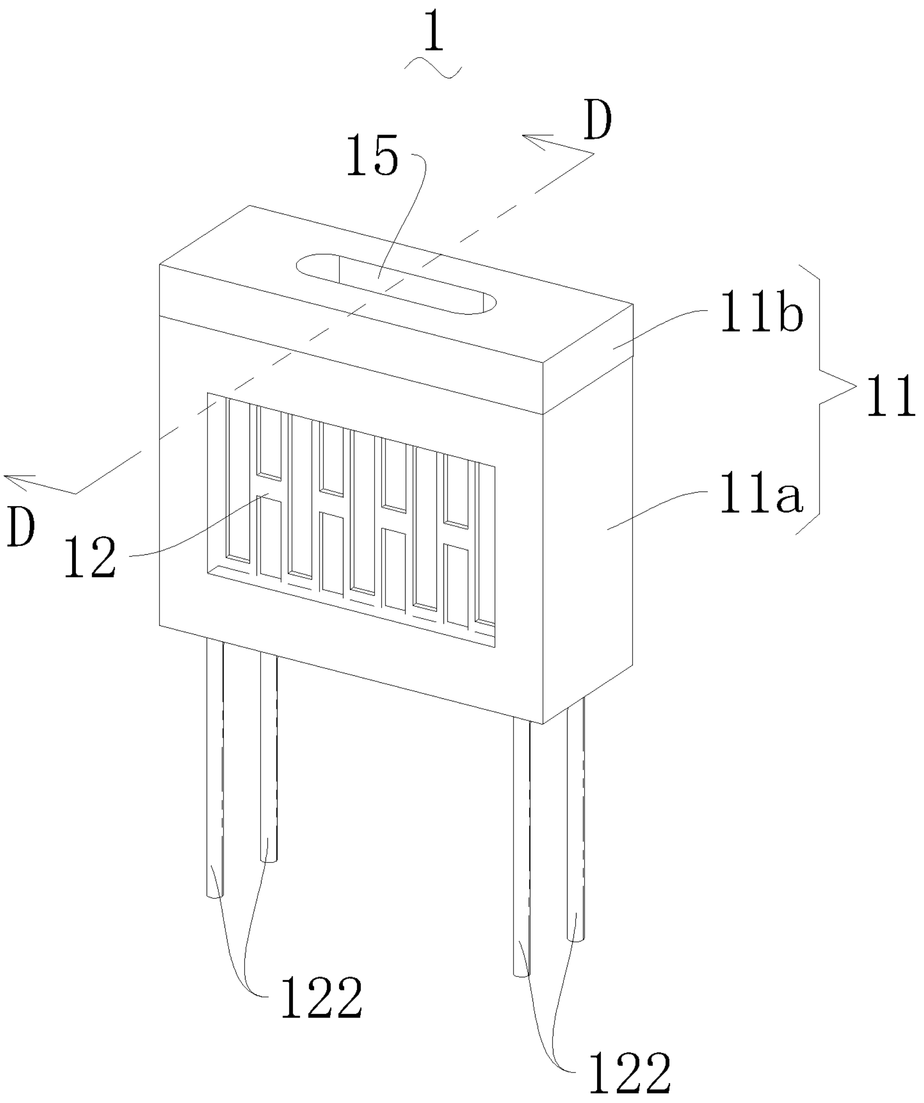
FIG. 15 is a schematic structural view of an efficient reinforced heating assembly in a third embodiment of the present disclosure.
Figure 16:
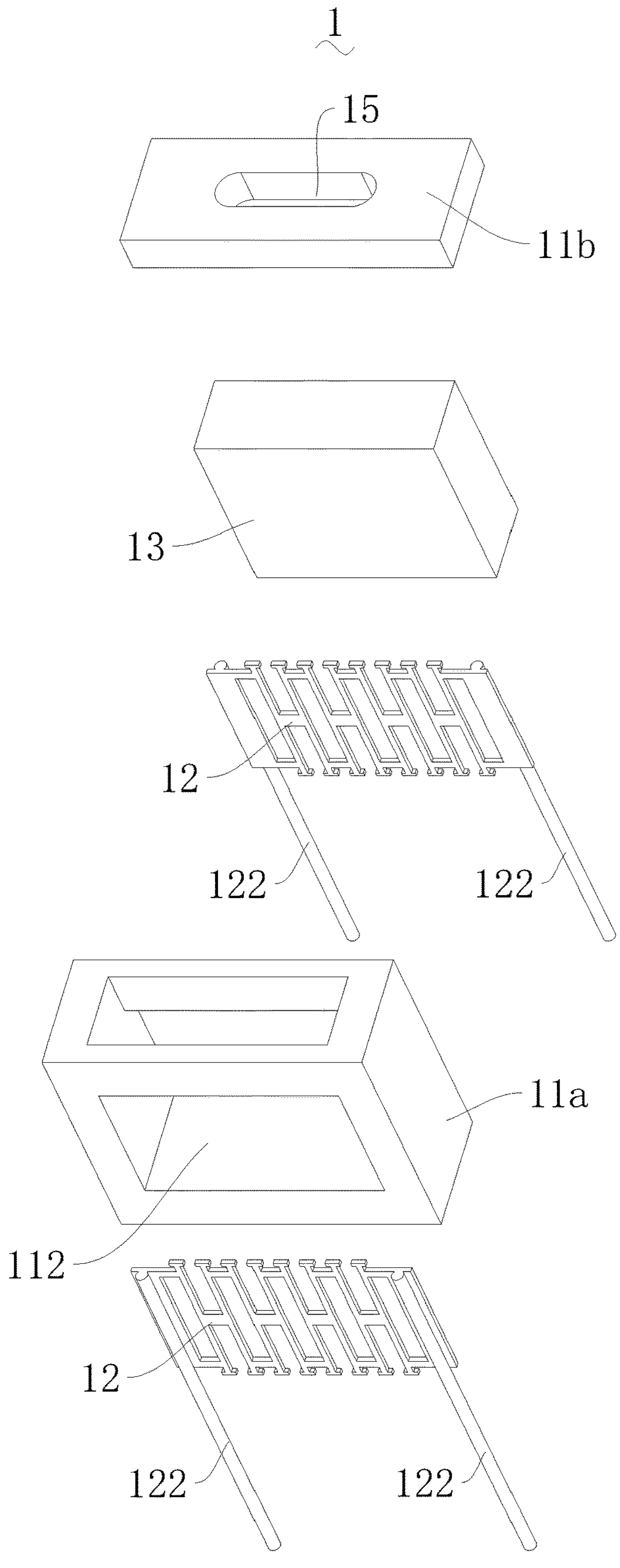
FIG. 16 is an exploded view of the efficient reinforced heating assembly in FIG. 15.
Figure 17:
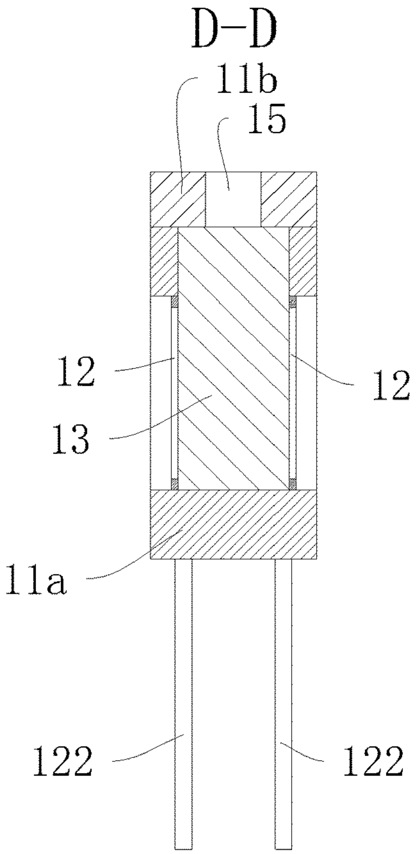
FIG. 17 is a D-D sectional view of FIG. 15.
Figure 18:
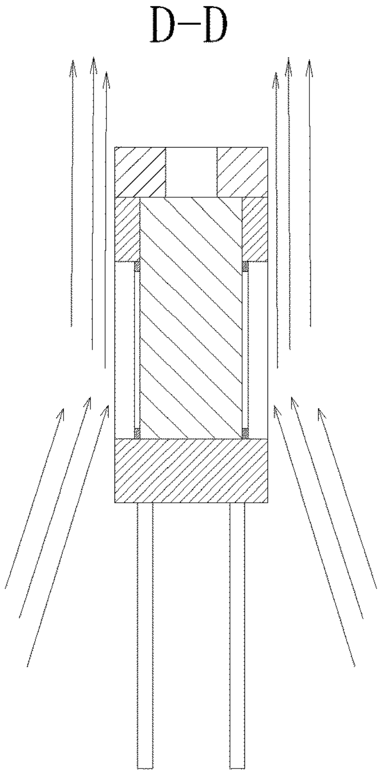
FIG. 18 is a schematic diagram showing an airflow direction of the efficient reinforced heating assembly in FIG. 17 (wherein the arrows indicate the airflow direction)
Figure 19:
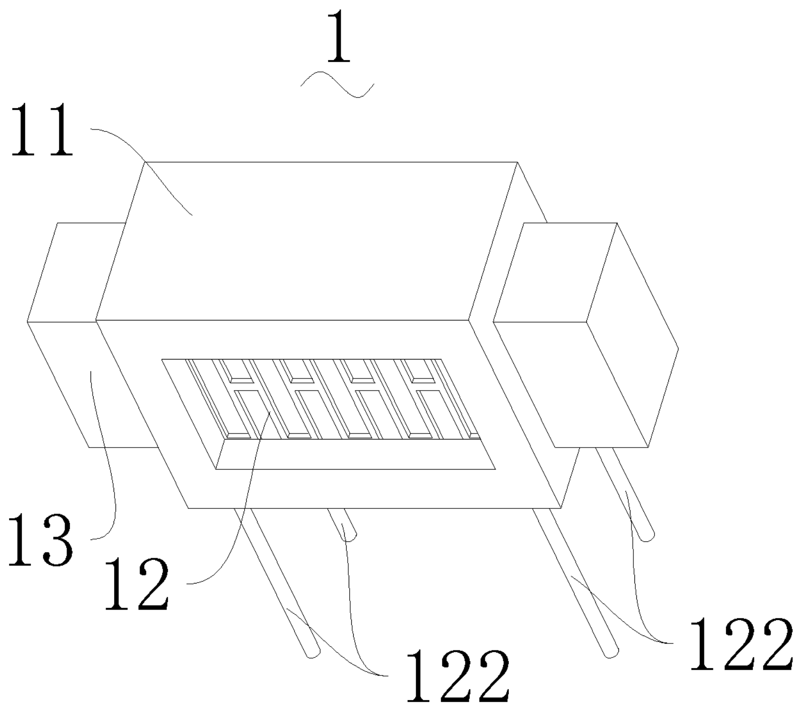
FIG. 19 is a schematic structural view of an efficient reinforced heating assembly in a fourth embodiment of the present disclosure.
Figure 20:
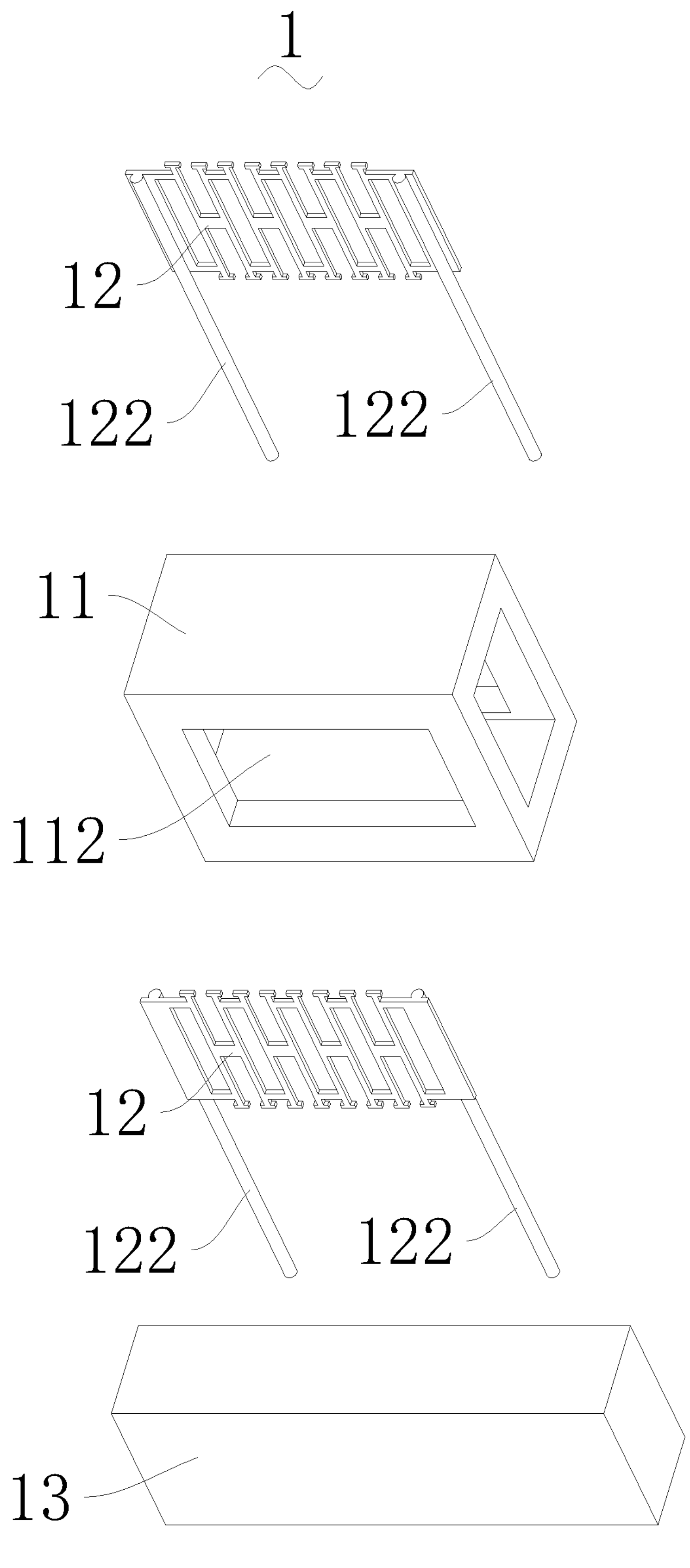
FIG. 20 is a sectional view of the efficient reinforced heating assembly in FIG. 19.
Figure 21:
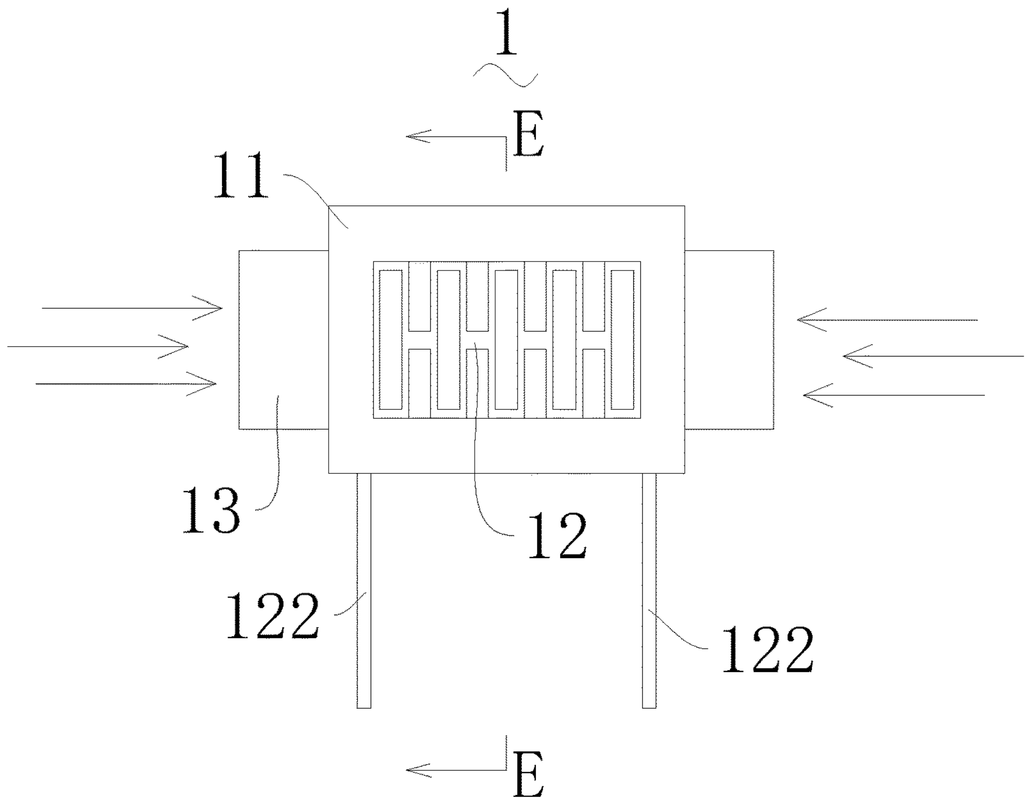
FIG. 21 is a schematic diagram showing a liquid conduction of the efficient reinforced heating assembly in FIG. 19 (wherein the arrows indicate the flow direction of the liquid)
Figure 22:
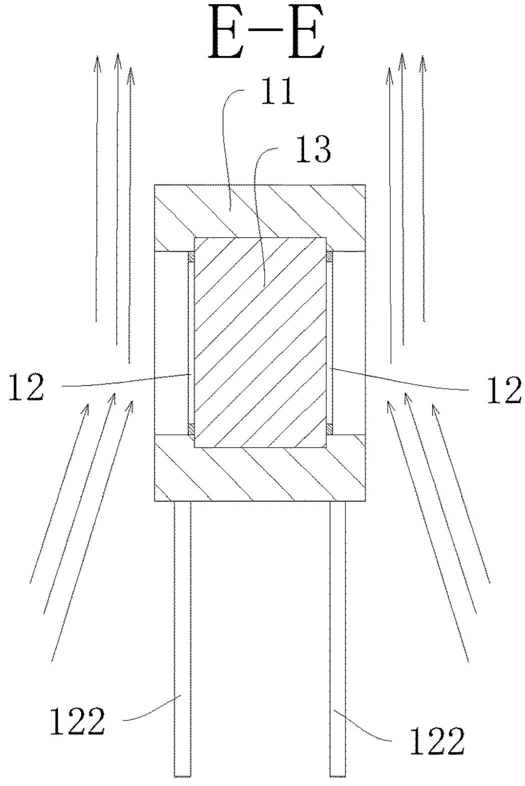
FIG. 22 is an E-E sectional view of FIG. 21 (wherein the arrows indicate the airflow direction)
Figure 23:
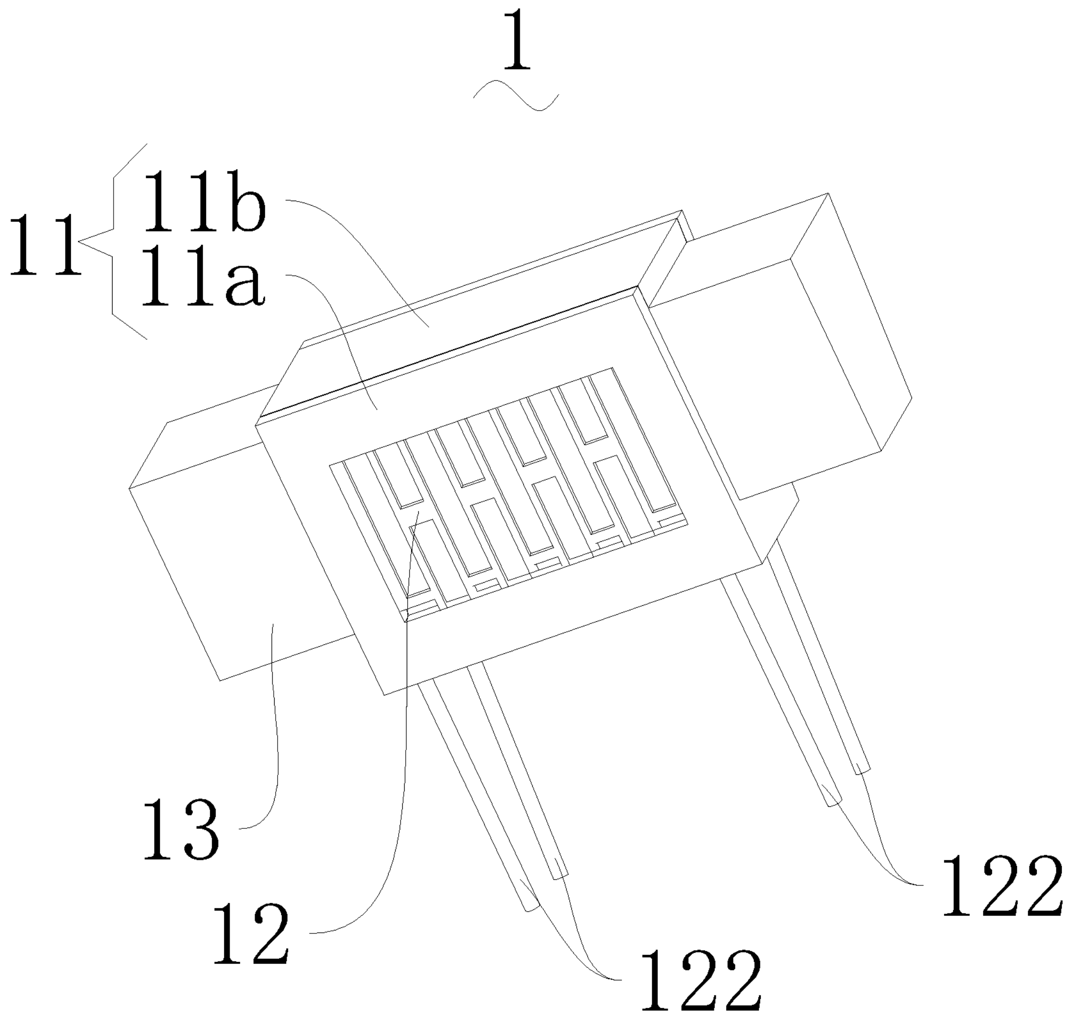
FIG. 23 is a schematic structural view of an efficient reinforced heating assembly according to a fifth embodiment of the present disclosure.
Figure 24:
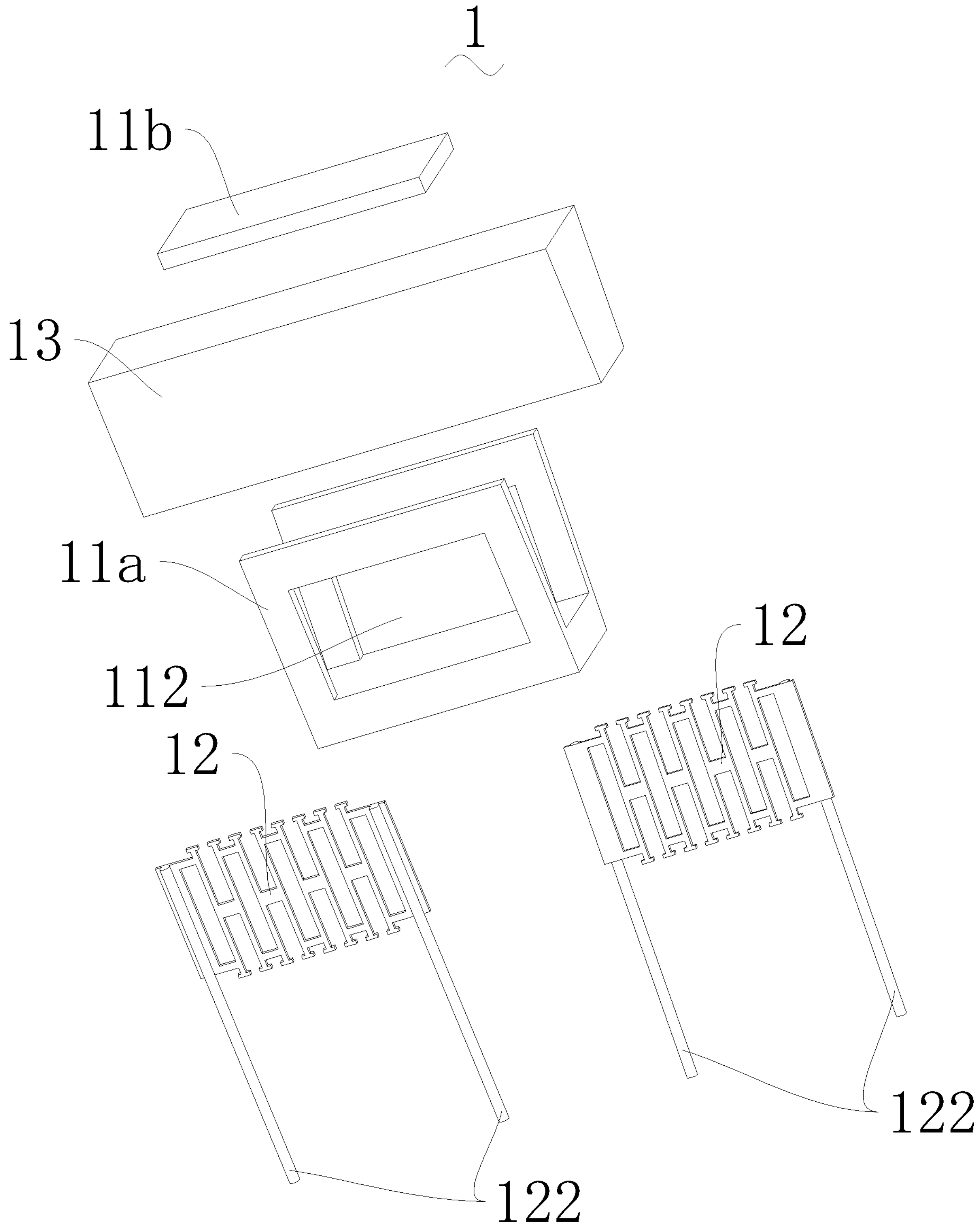
FIG. 24 is an exploded view of the efficient reinforced heating assembly in FIG. 23.
Figure 25:
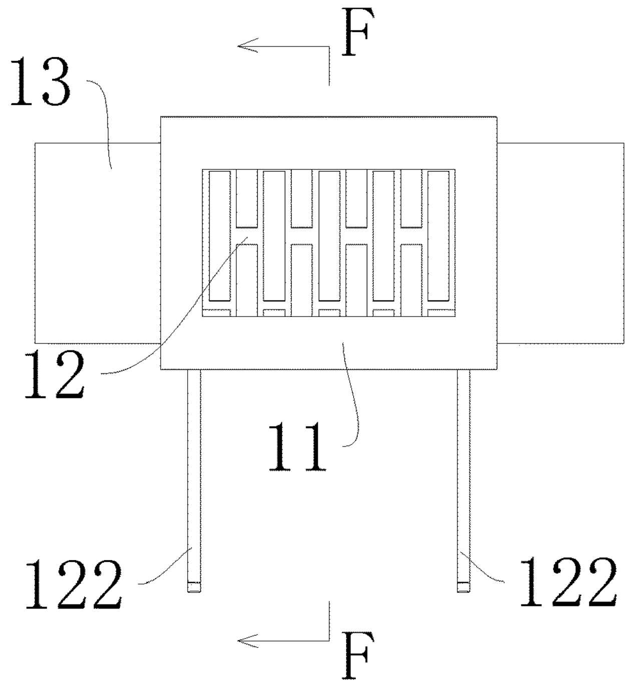
FIG. 25 is a front view of the efficient reinforced heating assembly in FIG. 23.
Figure 26:
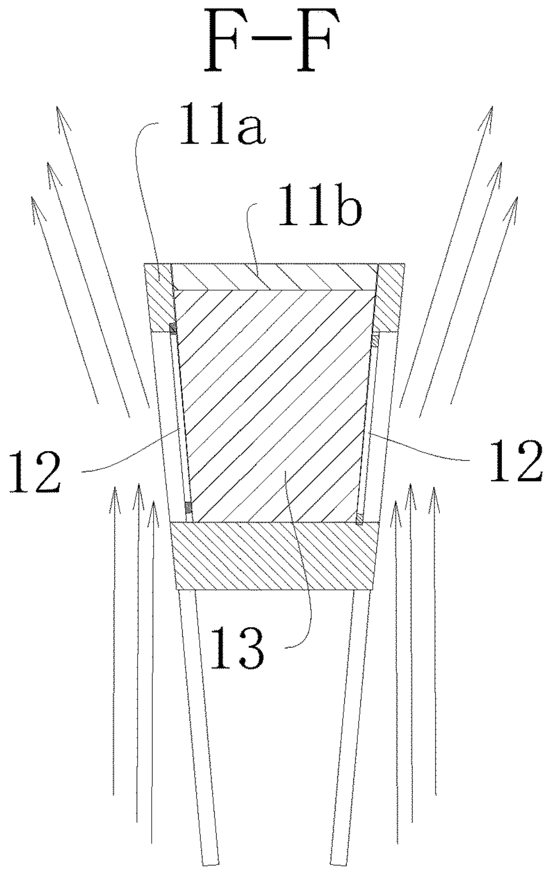
FIG. 26 is an F-F sectional view of FIG. 25 (wherein the arrows indicate the airflow direction)

Referring to the first embodiment of the heating member 12 in FIG. 6, each contact portion 12*b* includes a longitudinal portion extending outward from an edge of the heating portion 12*a* and a transverse portion arranged at a distal end of the longitudinal portion. The longitudinal portion and the transverse portion are not parallel to each other, preferably perpendicular to each other, and in a “T” shape design, so that the frame can better fix the heating member 12, prevent deformation of heating member 12. Alternatively, referring to the second embodiment of the heating member 12 in FIG. 7, each contact portion 12*b* is in a straight strip shape, and extends outward from the edge of the heating portion 12*a*. Or alternatively, referring to the third embodiment of the heating member 12 in FIG. 8, the contact portion 12*b* extends outward from the edge of the heating portion 12*a*, and is provided with a hollow fixing hole 123, so that the contact portion 12*b* is in an annular frame shape, so as to facilitate a portion of the frame to be embedded into the hollow fixing hole 123 and achieve a better fixing effect. Referring to the fifth embodiment of the heating member 12 in FIG. 10, the contact portion 12*b* can be bent toward a thickness direction of the heating member 12, and the contact portion 12*b* can be embedded into the reinforcing frame 11, so that the heating member 12 has a better support strength.

The heating member 12 includes electrode portions 12*c* which are connected with the heating portion 12*a* and disposed on an out periphery of the heating portion 12*a* for electrical connection with an external power supply device. The electrode portion 12*c* is embedded in or attached to the reinforcing frame 11, and meanwhile plays a role of enhancing the strength of the heating member 12. The contact portions 12*b* are arranged on two longitudinal opposite sides, or upper and lower sides in other words, of the heating portion 12*a*; and the electrode portions 12*c* are arranged on two transverse opposite sides, or left and right sides in other words, of the heating portion 12*a*. Understandably, it can alternatively be reversed, that is, the contact portions 12*b* are arranged on the two transverse sides of the heating portion 12*a*, and the electrode portions 12*c* are arranged on the two longitudinal sides of the heating portion 12*a*. At least two electrode leads 122 are provided on two sides of the heating member 12. The electrode lead 122 is electrically connected with the electrode portion 12*c*, and the electrode lead 122 extends outward from a bottom of the heating assembly 1.

Referring to FIGS. 1-5, at least two heating members 12 are arranged on the reinforcing frame 11 toward different directions. Preferably, at least two heating members 12 are respectively arranged on different sides of the reinforcing frame 11. For example, the heating members 12 are located at least on two opposite sides or two adjacent sides of the reinforcing frame 11. In the embodiment of FIGS. 1-5, two heating members 12 are respectively arranged on the two opposite sides of the reinforcing frame 11.

Referring to the embodiment of FIGS. 1-5, the efficient reinforced heating assembly 1 adopts a reinforcing frame 11 with a plurality of hollow structures. The heating member 12 is arranged on an outer side of the reinforcing frame 11. The reinforcing frame 11 is provided with an airflow passage 111 extending from the top to the bottom thereof. The vent opening 112 communicates the heating member 12 with an inner side of the airflow passage 111, so that the aerosol generated by the heating member 12 can enter the airflow passage 111 via the vent opening 112. In FIGS. 1-5, two heating members 12 are respectively disposed on two opposite sides of the reinforcing frame 11.

The heating member 12 is preferably a sheet-like heating member 12. The sheet-like heating member 12 can be made of a metal material, such as nickel chromium alloy, iron chromium aluminum alloy, stainless steel, titanium alloy, nickel base alloy, or the like. The sheet-like heating member 12 with the hollow-out structure 121 can be formed by cutting, etching, or the like, the metal material. One surface of the heating portion 12*a* is in contact with the liquid conducting member 13. The frame is made of an insulating material with a temperature resistance above 260 degrees, such as plastic, ceramic, quartz, or the like. The contact portion 12*b* of the heating member 12 can be embedded in the frame or attached to a surface of the frame. The liquid conducting member 13 is in contact with a surface of the heating member 12. The liquid conducting member 13 can adopt a material with porous characteristics that can conduct the liquid 13, such as liquid conducting non-woven fabric, liquid conducting cotton, porous ceramic, or the like. Finally, the liquid conducting member 13 is fixed by the cover 14, thus the heating assembly is formed. The heating assembly defines a plurality of atomizing surfaces in one airflow passage 111, which makes the atomization area larger and thus has a better atomization experience.

Referring to FIGS. 1-5, the liquid conducting member 13 is arranged on the outer side of the heating member 12. The efficient reinforced heating assembly 1 includes a cover 14, which covers and fixes the liquid conducting member 13 and the heating member 12. The cover 14 is provided with a liquid inlet 15 communicating the liquid conducting member 13 with the outside, so that the external liquid can be in contact with the liquid conducting member 13 via the liquid inlet 15, and then conducted to the conductive member 12 through the liquid conducting member 13 for heating and atomizing.

Referring to FIGS. 1-5, the efficient reinforced heating assembly 1 includes at least two heating members 12, at least two liquid conducting members 13 and at least two covers 14 respectively arranged on two sides of the reinforcing frame 11. The outer side of the heating members 12 on each side of the reinforcing frame 11 is provided with the liquid conducting members 13. The cover 14 on each side of the reinforcing frame 11 covers the liquid conducting member 13 and the heating member 12.

Referring to FIGS. 1-5, the heating members 12, the liquid conducting members 13 and the covers 14 are arranged on two opposite sides of the reinforcing frame 11. Each cover 14 includes a main body 141 and extending portions 142 arranged on edges of two sides of the main body 141. An inner side of the main body 141 is provided with a receiving cavity 144 open towards the reinforcing frame 11 and in a shape matched with the liquid conducting member 13. The liquid conducting member 13 is received in the receiving cavity 144. The extending portions 142 of the two covers 14 pass by the side of the reinforcing frame 11 in a direction opposite to each other, and the front ends of the extending portions 142 of the two covers 14 on two sides are butted against each other.

Referring to the embodiment of FIGS. 11-14, the airflow passage 111 includes an air outlet 111*a* arranged in a top surface of the reinforcing frame 11 and an air inlet 111*b* arranged in a bottom surface of the reinforcing frame 11. A size of the air outlet 111*a* is smaller than that of the air inlet 111*b*, and an inner diameter of the airflow passage 111 gradually decreases in a direction from the air inlet 111*b* to the air outlet 111*a*. The heating member 12 is inclined to the ventilation direction of the airflow passage 111, so that the side of the heating member 12 in contact with the air is inclined towards the air inlet direction of the airflow passage 111, the heating member 12 is inclined to the ventilation direction of the airflow passage 111, so that the airflow is blown to the side of the heating member 12 in contact with the air. In the embodiment of FIGS. 11-14, the two heating members 12 opposite to each other are inclined, and a distance between upper edges of the two heating members 12 is less than a distance between lower edges of the two heating members 12. In this way, the airflow can better pass by the surfaces of heating members 12, and the incoming cold air can better bring out the atomized aerosol with a high temperature, and can avoid the heat accumulation problem caused by the inability of the atomized aerosol with a high temperature to be brought out smoothly.

Referring to the embodiment of the efficient reinforced heating assembly 1 in FIGS. 15-18, the liquid conducting member 13 is received in the reinforcing frame 11, the inner side of the heating member 12 is in contact with the liquid conducting member 13, and the vent opening 112 communicates the heating member 12 with the outer side of the reinforcing frame 11, in other words, the outer side of the heating member 12 is exposed to the outside.

Referring to FIGS. 15-18, different heating members 12 are respectively in contact with different sides of the liquid conducting member 13, and at least two vent openings 112 are respectively defined in the sides, corresponding to the heating members 12, of the reinforcing frame 11. Preferably, the heating members 12 are respectively in contact with two opposite sides of the liquid conducting member 13, the vent openings 112 are respectively defined in two opposite sides of the reinforcing frame 11. The number of the heating members 12 and the vent openings 112 can be two respectively, and the two heating members 12 are disposed on one reinforcing frame 11, and one liquid conducting member 13 is disposed between the two heating members 12. The two heating members 12 are connected with the one liquid conducting member 13, and the cover 14 is disposed above, and the liquid enters from the above. For the heating assembly with this structure, the exposed surface of the heating member 12 is on the outer surface thereof, and the atomized aerosol is brought out when the airflow passes by the outer surface of the outer heating member 12. The heating assembly with this structure has the advantages that the structure is more compact, the space volume occupied is small, the position of the liquid inlet 15 is single, the heating assembly can be modularized and can be applied in different atomizing devices.

Referring to FIGS. 15-18, a top surface or a side surface of the reinforcing frame 11 is provided with a liquid inlet 15 for communicating the liquid conducting member 13 with the outside, so that the external liquid can contact the liquid conducting member 13 via the liquid inlet 15, and then be transmitted to the heating member 12 through the liquid conducting member 13 for heating and atomizing. The reinforcing frame 11 includes a first portion 11*a* and a second portion 11*b*. The first portion 11*a* is provided with a cavity with an upward opening, the liquid conducting member 13 is arranged in the cavity, the heating member 12 is arranged on the first portion 11*a*, and the vent opening 112 is defined in the first portion 11*a*. The second portion 11*b* is arranged on an upper side of the first portion 11*a* to cover the liquid conducting member 13, and the liquid inlet 15 is defined in the second portion 11*b*.

Referring to the embodiment of FIGS. 19-22, the liquid conducting member 13 extends laterally out of the reinforcing frame 11 for the external liquid to be in contact with the liquid conducting member 13 via the liquid inlet 15, and then conducted to the heating member 12 through the liquid conducting member 13 for heating and atomizing. Two heating members 12 can be provided on a reinforcing frame 11, and a liquid conducting member 13 extends transversely between the two heating members 12. The external liquid is conducted to the middle of the liquid conducting member 13 from the two exposed ends of the liquid conducting member 13. The upper side and the lower side of the reinforcing frame 11 are closed. The airflow mode of this structure is also that the airflow passes by the outer surface of the heating member 12 to bring out the atomized aerosol. The advantage of this structure is that the vent hole above the atomizer can be more easily designed due to that the air enters from a lower side and exits from an upper side, and the liquid enters from two lateral sides.

Figure 27:
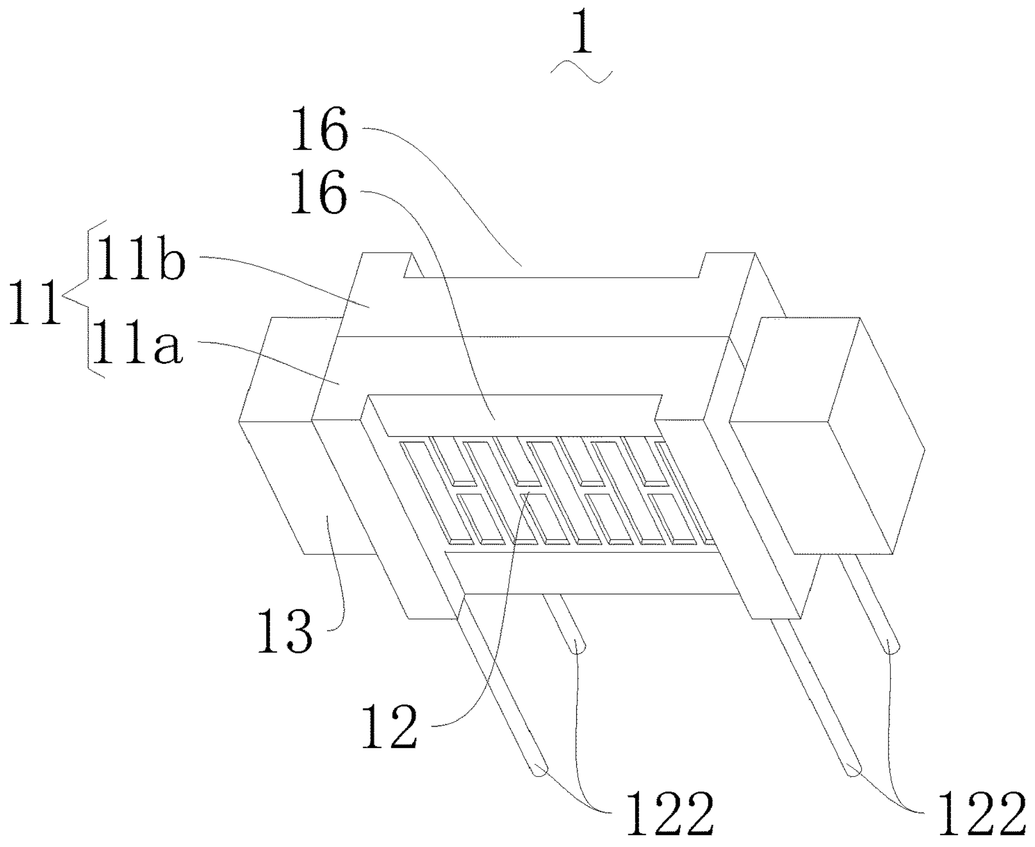
FIG. 27 is a schematic structural view of an efficient reinforced heating assembly according to a sixth embodiment of the present disclosure.
Figure 28:
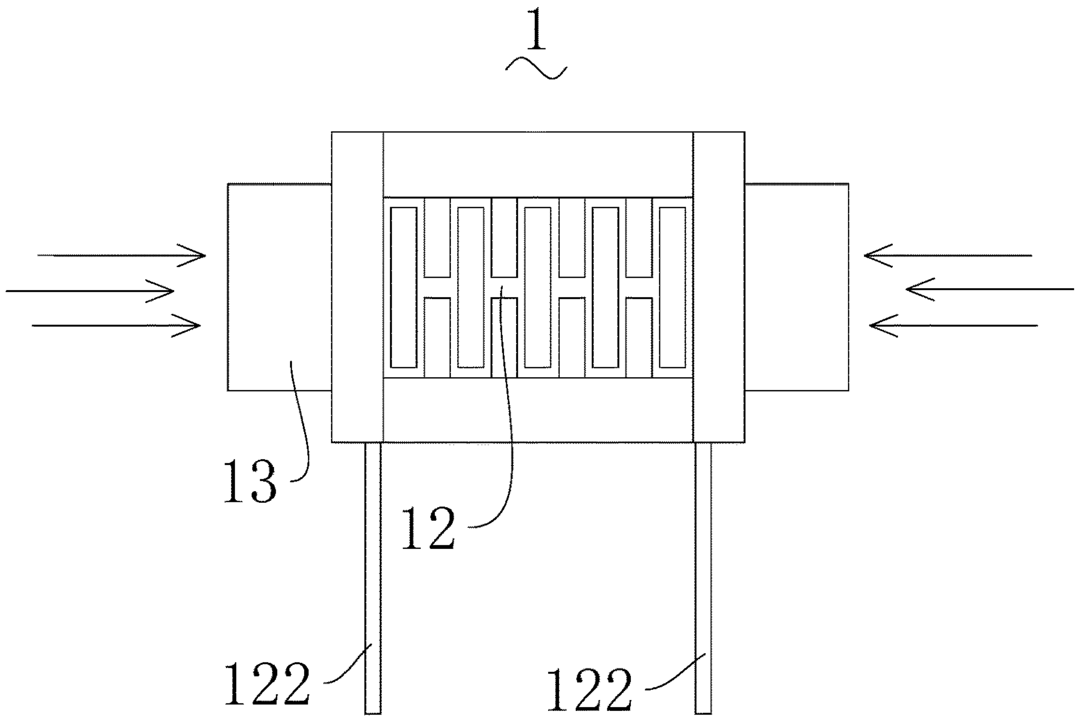
FIG. 28 is a front view of the efficient reinforced heating assembly in FIG. 27 (wherein the arrows indicate the flow direction of the liquid)
Figure 29:
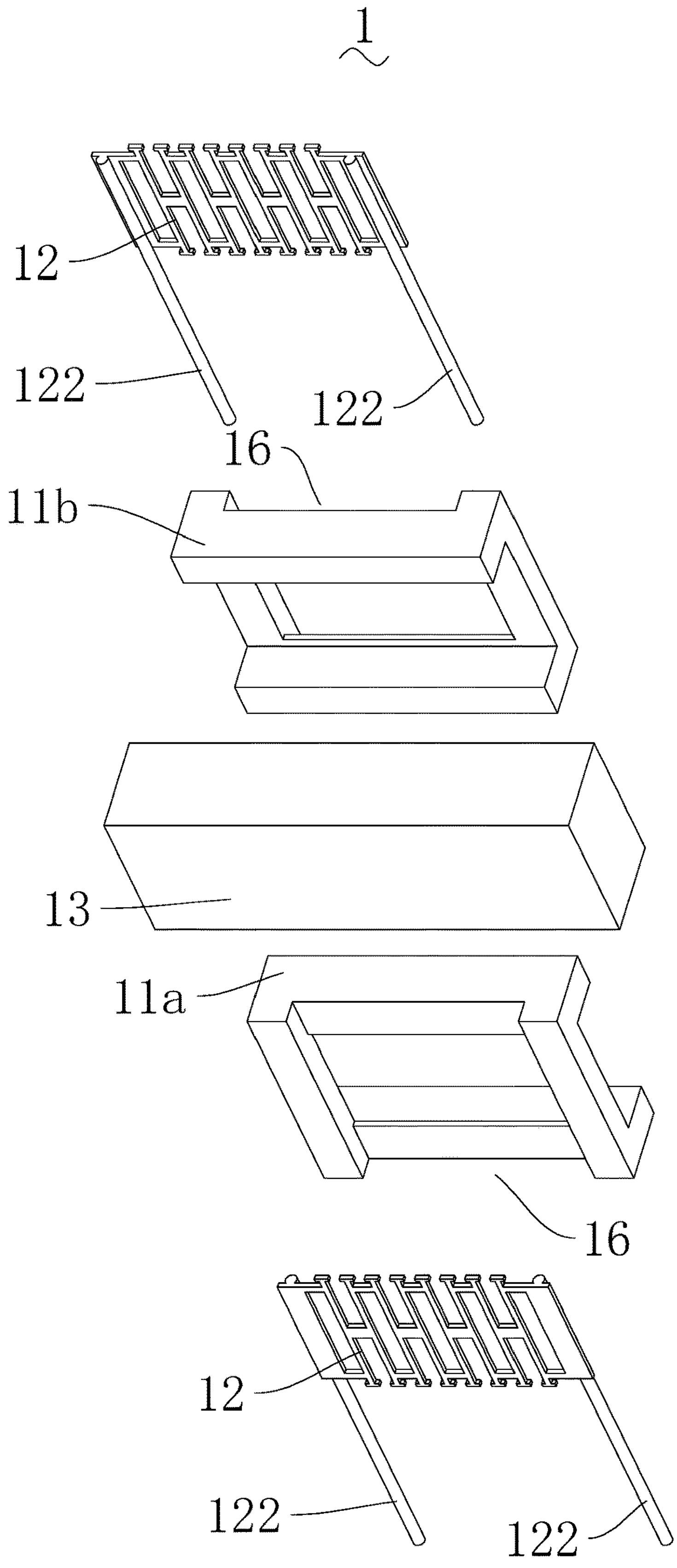
FIG. 29 is an exploded view of the efficient reinforced heating assembly in FIG. 27.
Figure 30:
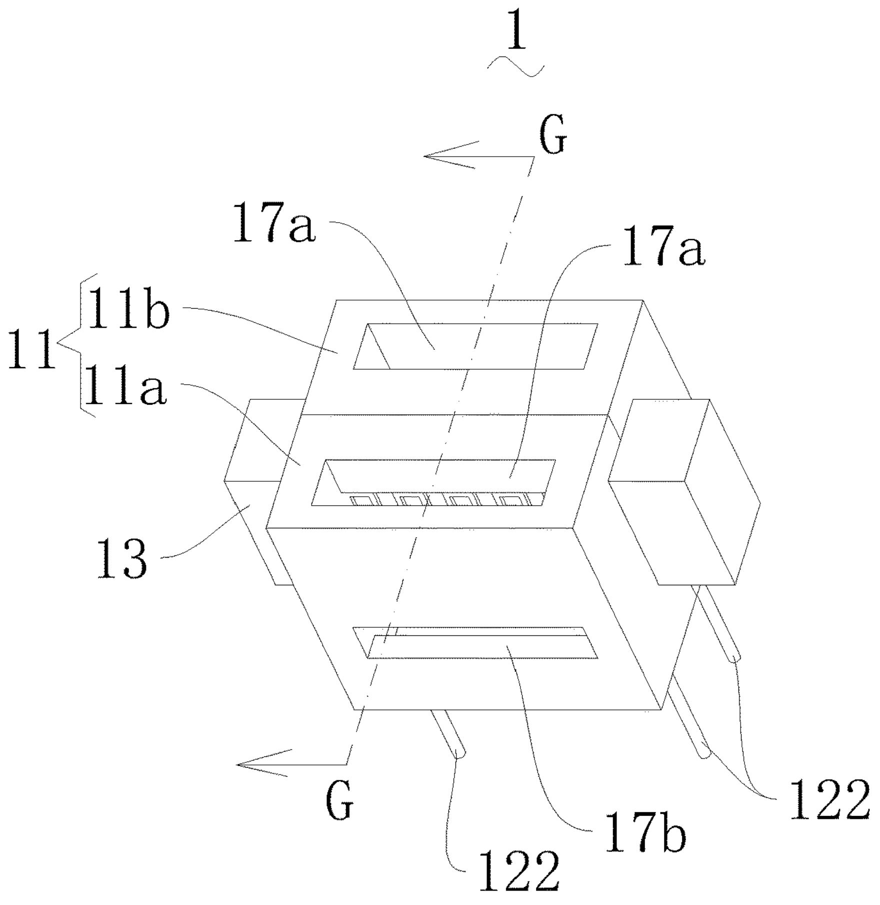
FIG. 30 is a schematic structural view of an efficient reinforced heating assembly according to a seventh embodiment of the present disclosure.
Figure 31:
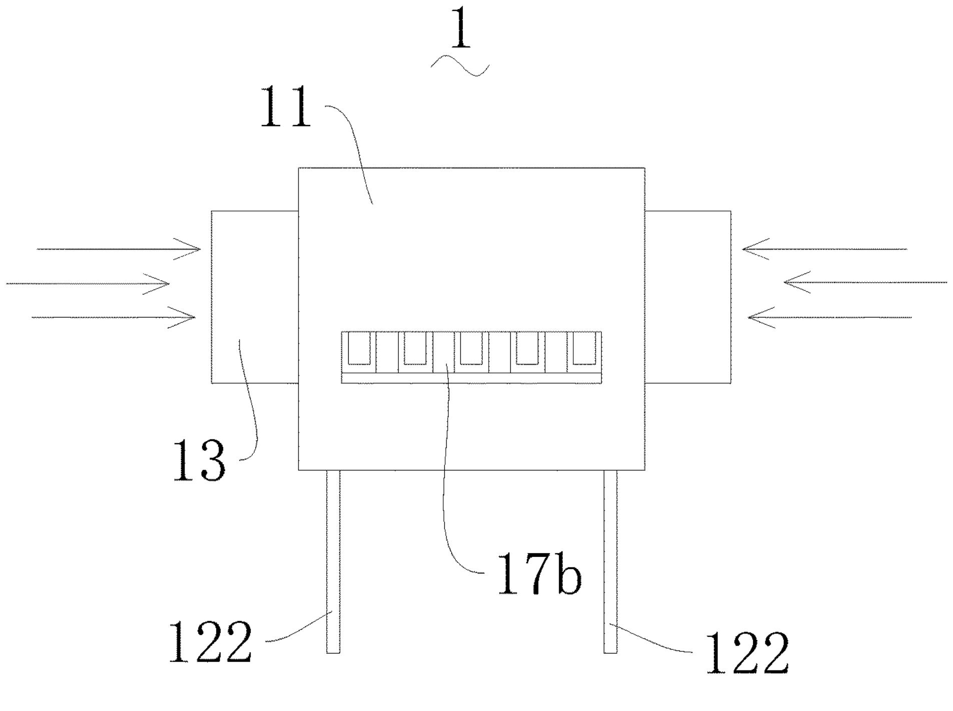
FIG. 31 is a front view of the efficient reinforced heating assembly in FIG. 30 (wherein the arrows indicate the flow direction of the liquid)
Figure 32:
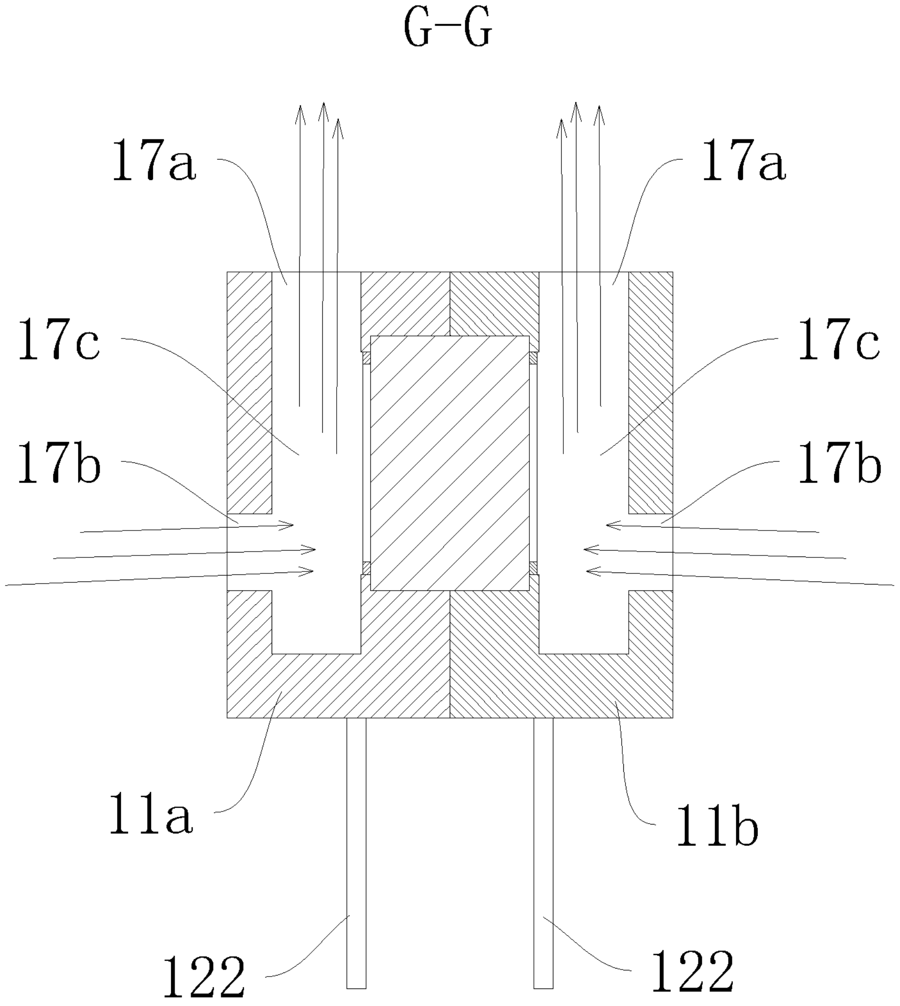
FIG. 32 is a G-G sectional view of FIG. 30 (wherein the arrows indicate the airflow direction)
Figure 33:
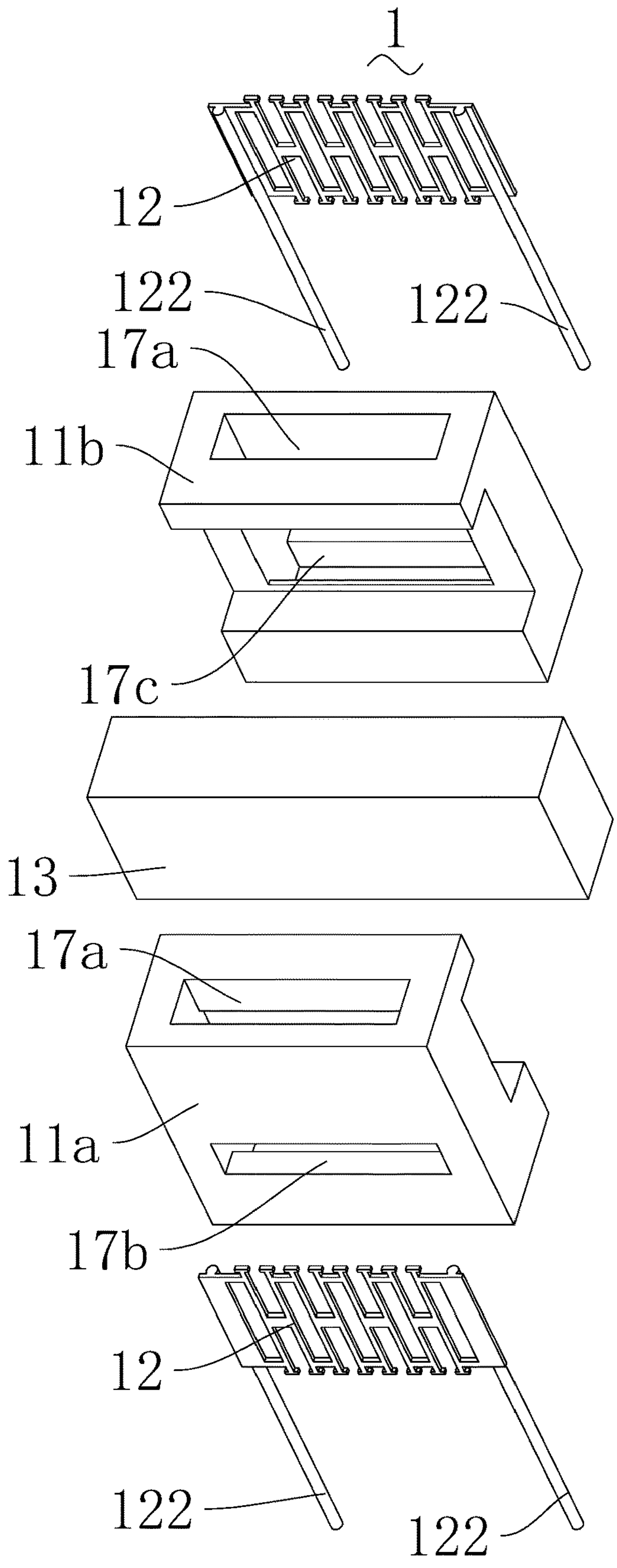
FIG. 33 is an exploded view of the efficient reinforced heating assembly in FIG. 30.

The embodiment of FIGS. 27-29 is an improvement on the basis of the embodiment of FIGS. 19-22. An outer side of the reinforcing frame 11 is provided with a ventilation groove 16 extending from a bottom surface to a top surface thereof. At least part of the heating portion 12*a* of the heating member 12 is exposed in the ventilation groove 16, so that the aerosol generated by the heating member 12 can be taken away more easily when the airflow passes through the ventilation groove 16. In this structure, a single heating assembly 1 is formed by disposing a single heating member 12 on a reinforcing frame 11, and two heating assemblies 1 can be spliced to form a double heating assembly 1. The airflow mode of this structure is also that the airflow passes by the outer surface of the heating member 12 to bring out the atomized aerosol. The advantage of this structure is that the assembly is more facilitated. The reinforcing frame 11 and the heating member 12 are first assembled to form the heating assembly 1, the liquid conducting member 13 is provided between the two heating members 12, and then the two heating members 12 are connected together.

The embodiment of FIGS. 30-33 is an improvement on the basis of the embodiment of FIGS. 19-22. A top surface of the reinforcing frame 11 is provided with a longitudinal air port 17*a*, a lateral surface of the reinforcing frame 11 is provided with a transverse air port 17*b*, a communicating passage 17*c* for communicating the longitudinal air port 17*a* with the transverse air port 17*b* is provided in the reinforcing frame 11, and the transverse air port 17*b* faces the exposed portion of the heating member 12. At least part of the heating portion 12*a* of the heating member 12 is exposed in the communicating passage 17*c*, so that the airflow successively passes through the transverse air port 17*b*, the communicating passage 17*c* and the longitudinal air port 17*a* to bring out the aerosol generated by the heating member 12. In this embodiment, the liquid conducting member 13 extends transversely between two heating sheets, the liquid is fed from two lateral sides to the middle, and the airflow passage is defined in the frame. Air enters from the lateral side and exits from the upper side. Since the transverse air port 17*b* faces the exposed portion of the heating member 12, the airflow entering the transverse air port 17*b* is blown directly to the heating member 12, which is more beneficial to the cooling of the heating member 12. Moreover, since the transverse air port 17*b* extends laterally, and the transverse air port 17*b*, the communicating passage 17*c* and the longitudinal air port 17*a* preferably form an L-shaped airflow passage, which is better to prevent liquid leakage than the air entering from the lower side and directly reaching the heating member 12. The transverse air port 17*b*, the communicating passage 17*c* and the longitudinal air port 17*a* form a circuitous airflow passage, so that the condensed liquid generated when the atomized aerosol contacts a lower-temperature portion is not easy to leak out from the transverse air port 17*b*.

In the embodiments of FIGS. 27-29 and FIGS. 30-33, the reinforcing frame 11 may include a first portion 11*a* and a second portion 11*b*. The first portion 11*a* and the second portion 11*b* frame the liquid conducting member 13 from two sides of the liquid conducting member 13 and are connected with each other. At least one heating member 12 is provided on the lateral side of the liquid conducting member 13 and disposed on the reinforcing frame 11, embedded in or abutted against the reinforcing frame 11. Preferably, at least two heating members 12 are provided, and are respectively located on two sides of the liquid conducting member 13, and the heating members 12 on the two sides are embedded in or abutted against the first portion 11*a* and the second portion 11*b* of the reinforcing frame 11, respectively.

Referring to the embodiment of FIGS. 23-26, the heating member 12 is arranged obliquely to the airflow direction, preferably obliquely to the longitudinal direction, so that the airflow is blown to the side of the heating member 12 in contact with the air, thereby the airflow can better pass by the surface of the heating member 12, and the incoming cold air can better bring out the atomized aerosol with a higher temperature, avoiding the problem of heat accumulation caused by the inability of atomized aerosol with the higher high temperature to be brought out smoothly. The reinforcing frame 11 includes a first portion 11*a* and a second portion 11*b*. The first portion 11*a* is provided with a cavity having an upward opening, the liquid conducting member 13 is arranged in the cavity and extends laterally outward, the heating member 12 is arranged on the first portion 11*a*, and the vent opening 112 is defined in the first portion 11*a*. The second portion 11*b* is arranged on the upper side of the first portion 11*a* to cover the liquid conducting member 13, and the liquid conducting member 13 is in contact with the external liquid through the extending outward portion thereof. The liquid conducting member 13 can be assembled into the reinforcing frame 11 through the opening of the first portion 11*a* of the reinforcing frame 11, and has good contact with the heating member 12. This kind of structure has the advantages of convenient and simple assembly and high reliability.

Figure 34:
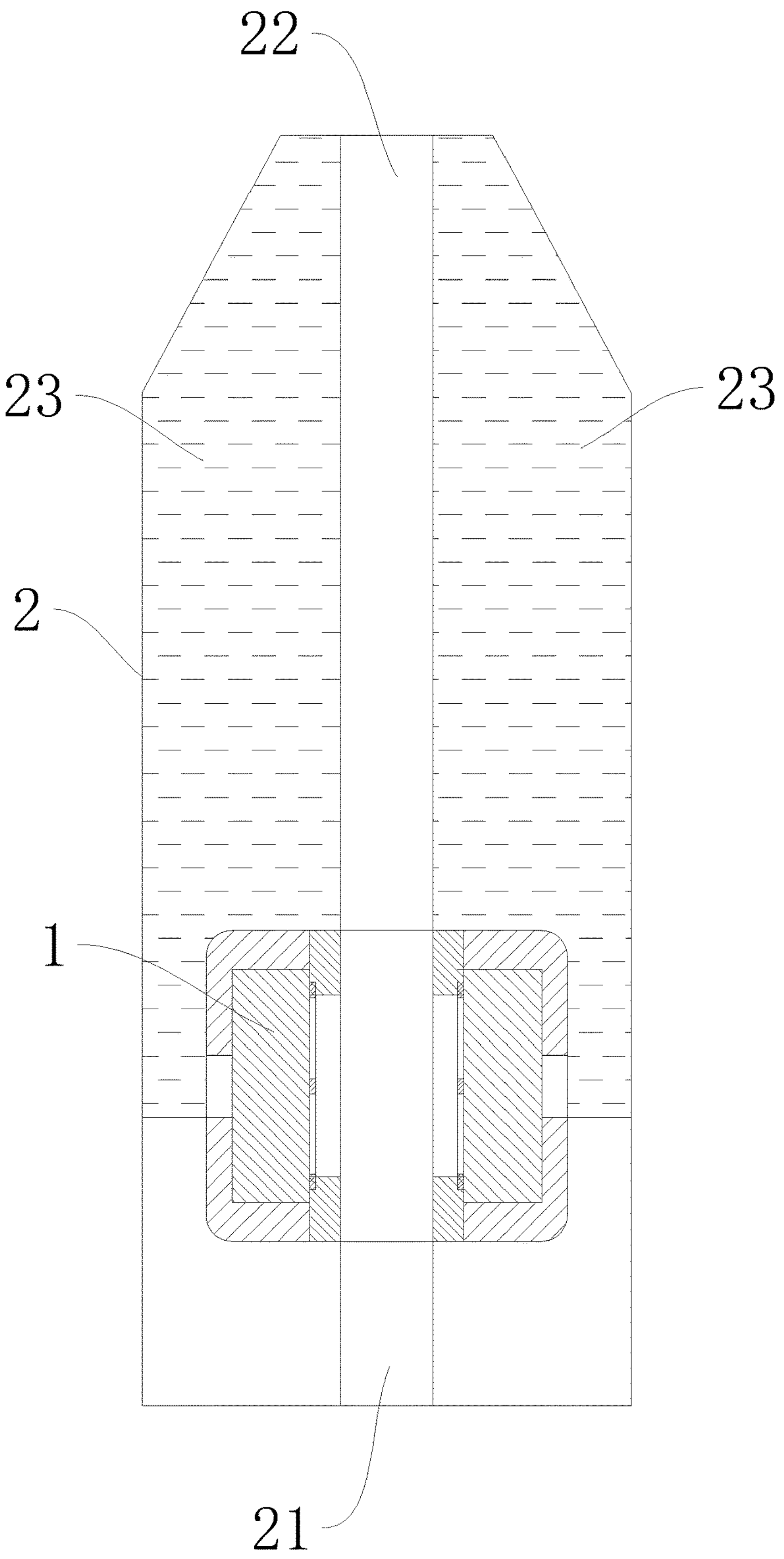
FIG. 34 is an internal structure diagram of an atomizing device according to an embodiment of the disclosure.

Referring to FIG. 34, an atomizing device according to an embodiment of the present disclosure includes a shell 2 and the above efficient reinforced heating assembly 1 for heating and atomizing arranged in the shell 2. The shell 2 is provided with an air inlet passage 21 and an air outlet passage 22 which are successively communicated, and the air inlet passage 21 and the air outlet passage 22 are respectively communicated with two ends of the airflow passage 111; the shell 2 is provided with a liquid storage chamber 23 therein, and the liquid storage chamber 23 is communicated with the liquid conducting member 13, so that the liquid in the liquid storage chamber 23 can be transmitted to the heating member 12 through the liquid conducting member 13 for heating and atomizing, and the airflow can successively pass through the air inlet passage 21, the airflow passage 111 and the air outlet passage 22, to output the aerosol generated by the heating assembly 1 via the air outlet passage 22. The liquid storage chamber 23 can be configured to receive a smoke liquid, which is heated and atomized by the heating assembly 1, and correspondingly the atomizing device is used in an electronic cigarette.

In the atomizing device, the reinforcing frame 11 of the heating assembly 1 plays a role in supporting the heating member 12, thereby improving the strength of the heating member 12; moreover, since at least two heating members 12 are provided, the heating atomization efficiency is higher, and the effect of small volume and large atomization amount is realized.

The above embodiments illustrate only the preferred embodiments of the present disclosure, of which the description is made in a specific and detailed way, but should not be thus construed as being limiting to the scope of the claims of present disclosure. Those having ordinary skill of the art may freely make combinations of the above-described technical features and make contemplate certain variations and improvements, without departing from the idea of the present disclosure, and all these are considered within the coverage scope of the claims of the present disclosure.

What is claimed is:

1. An efficient reinforced heating assembly (1), characterized by comprising:

a reinforcing frame (11), wherein the reinforcing frame (11) is provided with a vent opening (112) for air to pass therethrough;

at least two heating members (12), wherein the at least two heating members (12) are disposed on the reinforcing frame (11), disposed in the vent opening (112) or covered on the vent opening (112), to be in contact with the air; and at least one liquid conducting member (13), wherein the at least one liquid conducting member (13) is disposed on at least one side of the at least two heating members (12) and in contact with the at least two heating members (12), so that the at least one liquid conducting member (13) is able to conduct an external liquid to the at least two heating members (12) for heating and atomizing to generate an aerosol, which is output via the vent opening (112); the liquid conducting member (13) is received in the reinforcing frame (11), an inner side of the heating member (12) is in contact with the liquid conducting member (13), and the vent opening (112) communicates the heating member (12) with an outer side of the reinforcing frame (11).

2. The efficient reinforced heating assembly (1) according to claim 1, wherein each heating member (12) comprises a heating portion (12*a*), and the heating portion (12*a*) is provided with a hollow-out structure (121) to form a circuit track for heating, so that the heating portion (12*a*) generates heat when the heating member (12) is powered on.

3. The efficient reinforced heating assembly (1) according to claim 2, wherein each heating member (12) comprises a contact portion (12*b*) disposed on an outer periphery of the heating portion (12*a*) and connected with the heating portion (12*a*), and the contact portion (12*b*) is embedded in or attached to the reinforcing frame (11), so as to fix the heating member (12) on the reinforcing frame (11).

4. The efficient reinforced heating assembly (1) according to claim 3, wherein the contact portion (12*b*) comprises a longitudinal portion extending outward from an edge of the heating portion (12*a*) and a transverse portion disposed on the longitudinal portion, and the longitudinal portion is not parallel to the transverse portion; or alternatively, the contact portion (12*b*) is in a straight strip shape, and extends outward from an edge of the heating portion (12*a*); or alternatively, the contact portion (12*b*) extends outward from an edge of the heating portion (12*a*), and is provided with a fixing hole (123), and the contact portion (12*b*) is in an annular frame shape.

5. The efficient reinforced heating assembly (1) according to claim 4, wherein the contact portion (12*b*) is bent toward a thickness direction of the heating member (12).

6. The efficient reinforced heating assembly (1) according to claim 2, wherein each heating member (12) comprises an electrode portion (12*c*) connected with the heating portion (12*a*) and disposed on an outer periphery of the heating portion (12*a*); and the electrode portion (12*c*) is embedded in or attached to the reinforcing frame (11).

7. The efficient reinforced heating assembly (1) according to claim 1, wherein the at least two heating members (12) are respectively disposed on different sides of the reinforcing frame (11).

8. The efficient reinforced heating assembly (1) according to claim 1, wherein the heating members (12) is disposed on an outer side of the reinforcing frame (11); the reinforcing frame (11) is provided with an airflow passage (111) extending from a top surface to a bottom surface thereof, and the vent opening (112) communicates the heating member (12) with an inner side of the airflow passage (111), so that the aerosol generated by the heating member (12) enters the airflow passage (111) via the vent opening (112).

9. The efficient reinforced heating assembly (1) according to claim 8, wherein the liquid conducting member (13) is disposed on an outer side of the heating members (12), the efficient reinforced heating assembly (1) comprises a cover (14), and the cover (14) covers and fixes the liquid conducting member (13) and the heating member (12); the cover (14) is provided with a liquid inlet (15) communicating the liquid conducting member (13) with an outside, so that the external liquid is in contact with the liquid conducting member (13) via the liquid inlet (15), and further conducted to the heating member (12) through the liquid conducting member (13) for heating and atomizing.

10. The efficient reinforced heating assembly (1) according to claim 9, wherein the efficient reinforced heating assembly (1) comprises at least two heating members (12), at least two liquid conducting members (13) and at least two covers (14) respectively disposed on two sides of the reinforcing frame (11); an outer side of the heating members (12) on each side of the reinforcing frame (11) is provided with one liquid conducting members (13), and the cover (14) on each side of the reinforcing frame (11) covers the liquid conducting member (13) and the heating member (12).

11. The efficient reinforced heating assembly (1) according to claim 10, wherein the heating members (12), the liquid conducting members (13) and the covers (14) are respectively disposed on two opposite sides of the reinforcing frame (11); each cover (14) comprises a main body (141) and extending portions (142) disposed on edges of two sides of the main body (141), and an inner side of the main body (141) is provided with a receiving cavity (144) open towards the reinforcing frame (11), each liquid conducting member (13) is received in the corresponding receiving cavity (144); the extending portions (142) of the covers (14) on two sides of the reinforcing frame (11) pass by a side of the reinforcing frame (11) in a direction opposite to each other, and front ends of the extending portions (142) of the covers (14) on two sides of the reinforcing frame (11) are butted against each other.

12. The efficient reinforced heating assembly (1) according to claim 8, wherein the airflow passage (111) comprises an air outlet (111*a*) defined in a top surface of the reinforcing frame (11) and an air inlet (111*b*) defined in a bottom surface of the reinforcing frame (11); and a side of the heating member (12) in contact with the air is inclined towards an air inlet direction of the airflow passage (111), so that the air flow is blown to the side of the heating member (12) in contact with the air.

13. The efficient reinforced heating assembly (1) according to claim 1, wherein the heating member (12) is disposed obliquely to an air flow direction, so that the air flow is blown to a side of the heating member (12) in contact with the air.

14. An atomizing device, comprising a shell (2) and an efficient reinforced heating assembly (1) disposed in the shell (2); wherein the efficient reinforced heating assembly (1) comprises:

a reinforcing frame (11), wherein the reinforcing frame (11) is provided with a vent opening (112) for air to pass therethrough;

at least two heating members (12), wherein the at least two heating members (12) are disposed on the reinforcing frame (11), disposed in the vent opening (112) or covered on the vent opening (112), to be in contact with the air; and at least one liquid conducting member (13), wherein the at least one liquid conducting member (13) is disposed on at least one side of the at least two heating members (12) and in contact with the at least two heating members (12), so that the at least one liquid conducting member (13) is able to conduct an external liquid to the at least two heating members (12) for heating and atomizing to generate an aerosol, which is output via the vent opening (112); the liquid conducting member (13) is received in the reinforcing frame (11), an inner side of the heating member (12) is in contact with the liquid conducting member (13), and the vent opening (112) communicates the heating member (12) with an outer side of the reinforcing frame (11).

15. The atomizing device according to claim 14, wherein each heating member (12) comprises a heating portion (12*a*), and the heating portion (12*a*) is provided with a hollow-out structure (121) to form a circuit track for heating, so that the heating portion (12*a*) generates heat when the heating member (12) is powered on; and wherein each heating member (12) further comprises a contact portion (12*b*) disposed on an outer periphery of the heating portion (12*a*) and connected with the heating portion (12*a*), and the contact portion (12*b*) is embedded in or attached to the reinforcing frame (11), so as to fix the heating member (12) on the reinforcing frame (11).

16. The atomizing device according to claim 15, wherein the contact portion (12*b*) comprises a longitudinal portion extending outward from an edge of the heating portion (12*a*) and a transverse portion disposed on the longitudinal portion, and the longitudinal portion is not parallel to the transverse portion; or alternatively, the contact portion (12*b*) is in a straight strip shape, and extends outward from an edge of the heating portion (12*a*); or alternatively, the contact portion (12*b*) extends outward from an edge of the heating portion (12*a*), and is provided with a fixing hole (123), and the contact portion (12*b*) is in an annular frame shape.

17. The atomizing device according to claim 14, wherein the heating members (12) is disposed on an outer side of the reinforcing frame (11); the reinforcing frame (11) is provided with an airflow passage (111) extending from a top surface to a bottom surface thereof, and the vent opening (112) communicates the heating member (12) with an inner side of the airflow passage (111), so that the aerosol generated by the heating member (12) enters the airflow passage (111) via the vent opening (112); and wherein the shell (2) is provided with an air inlet passage (21) and an air outlet passage (22), and the air inlet passage (21) and the air outlet passage (22) are respectively communicated with two ends of the airflow passage (111), so that an air flow successively passes through the air inlet passage (21), the airflow passage (111) and the air outlet passage (22), to output the aerosol generated by the heating assembly (1) via the air outlet passage (22).

18. The atomizing device according to claim 17, wherein the liquid conducting member (13) is disposed on an outer side of the heating members (12), the efficient reinforced heating assembly (1) comprises a cover (14), and the cover (14) covers and fixes the liquid conducting member (13) and the heating member (12); the cover (14) is provided with a liquid inlet (15) communicating the liquid conducting member (13) with an outside, so that the external liquid is in contact with the liquid conducting member (13) via the liquid inlet (15), and further conducted to the heating member (12) through the liquid conducting member (13) for heating and atomizing.

* * * * *